(12) United States Patent
Stewart et al.

(10) Patent No.: US 10,104,511 B2
(45) Date of Patent: Oct. 16, 2018

(54) RECOMMENDATIONS AND NOTIFICATIONS OVER LIMITED CONNECTIONS

(71) Applicant: Raytheon Company, Waltham, MA (US)

(72) Inventors: Peter L. Stewart, Rowlett, TX (US); Thomas M. Jurcak, Sachse, TX (US); William Ellis Kesterson, Parker, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 15/350,028

(22) Filed: Nov. 12, 2016

(65) Prior Publication Data

US 2017/0142562 A1 May 18, 2017

Related U.S. Application Data

(60) Provisional application No. 62/254,901, filed on Nov. 13, 2015.

(51) Int. Cl.
*H04W 4/00* (2018.01)
*H04W 4/12* (2009.01)
*H04L 29/08* (2006.01)
*H04L 29/06* (2006.01)

(52) U.S. Cl.
CPC .......... *H04W 4/12* (2013.01); *H04L 67/2823* (2013.01); *H04L 69/16* (2013.01)

(58) Field of Classification Search
CPC ....... H04W 4/12; H04L 67/2823; H04L 69/16
USPC ................ 455/466, 414.1, 423, 412.1, 412.2
See application file for complete search history.

(56) References Cited

U.S. PATENT DOCUMENTS

| 6,771,949 | B1* | 8/2004 | Corliss | H04L 51/24 455/413 |
| 8,209,217 | B1* | 6/2012 | Griffith | G06Q 10/0631 705/310 |
| 2004/0148423 | A1* | 7/2004 | Key | H04L 47/10 709/235 |
| 2014/0163967 | A1* | 6/2014 | Aratsu | G06F 17/27 704/9 |

(Continued)

*Primary Examiner* — Nghi H Ly
(74) *Attorney, Agent, or Firm* — Schwegman Lundberg & Woessner, P.A.

(57) ABSTRACT

Discussed herein are systems, devices, and methods for providing recommendations and notifications to an end user. A system can include an intelligence server including a common message server (CMS), query manager circuitry, an intelligence database, and alerting service circuitry, the CMS communicatively coupled between each of the query manager circuitry and the intelligence database, and the alerting service circuitry and the query manager circuitry, an intelligence computer communicatively coupled to the CMS of the intelligence server, the intelligence computer including a recommendation user interface (UI) and a notifier UI, and a mobile device communicatively coupled to the CMS, the mobile device configured to receive notifications and recommendations from the intelligence computer that are routed to the mobile device through the CMS.

17 Claims, 15 Drawing Sheets

(56) References Cited

U.S. PATENT DOCUMENTS

| | | | |
|---|---|---|---|
| 2015/0032464 A1* | 1/2015 | Vesto | G06F 19/3418 705/2 |
| 2016/0183068 A1* | 6/2016 | Shen | H04W 4/12 455/466 |

* cited by examiner

RECOMMENDATIONS AND NOTIFICATIONS OVER LIMITED CONNECTIONS

REFERENCE TO RELATED APPLICATION

This application claims the benefit of priority to provisional patent application No. 62/254,901, filed on Nov. 13, 2015, which is incorporated by reference herein in its entirety.

TECHNICAL FIELD

One or more embodiments relate to providing one or more recommendations and/or notifications to an end user.

TECHNICAL BACKGROUND

Tactical military and other networks have historically limited communication between the tactical operations center and the network edge ("tactical edge") to voice-only and/or point-to-point messaging. Such voice-only and/or point-to-point messaging limits what can be sent to an edge device.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION OF EMBODIMENTS

Some embodiments relate to providing a recommendation or notification to an end user. In one or more embodiments, the recommendation is provided with a payload adjustment (e.g., an automated payload adjustment) based on network or connection conditions. In one or more embodiments, an intelligence user can help eliminate false positives before forwarding the recommendation or notification (collectively referred to as a "message") to the proper personnel. A recommendation, as used herein The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Tactical military and other networks have historically limited communication between the tactical operations center and the network edge ("tactical edge") to voice-only and/or point-to-point messaging. Tactical edge users can benefit from vetted recommendations and/or notifications, alerting them to emerging threats or other pertinent information tailored to their mission or situation.

One or more embodiments include a fielded and proven tactical communication channel from Distributed Common Ground System (DCGS)-Army Increment 1 and Lite programs, with automatic detection of network conditions, such as can help for guaranteed delivery, to distribute recommendations and/or notifications. Recommendations can come from an integrated personal analytics engine, and notifications can come from both personal analytics and a Complex Event Processing (CEP) Engine, such as Intersect Sentry™ from Raytheon Company of Waltham, Mass., United States. One or more embodiments of the system can include a human in the loop (e.g., an intelligence analyst that can review the recommendation for quality before sending to the ground operations force or other end user). This constrains the machine-generated content to a suggestion only, which is then vetted by a human as pertinent, such as to help avoid false positives and unnecessary bandwidth usage impact to limited tactical networks. The notifications and/or recommendations can be tailored to the receiving system. For the Joint Battle Command Program (JBC-P), the Variable Message Format (VMF) standard is used. For BlackBird's Gotham system, also from Raytheon Company, and/or other mobile product line, a native inbound message format can be used.

Figure 1:
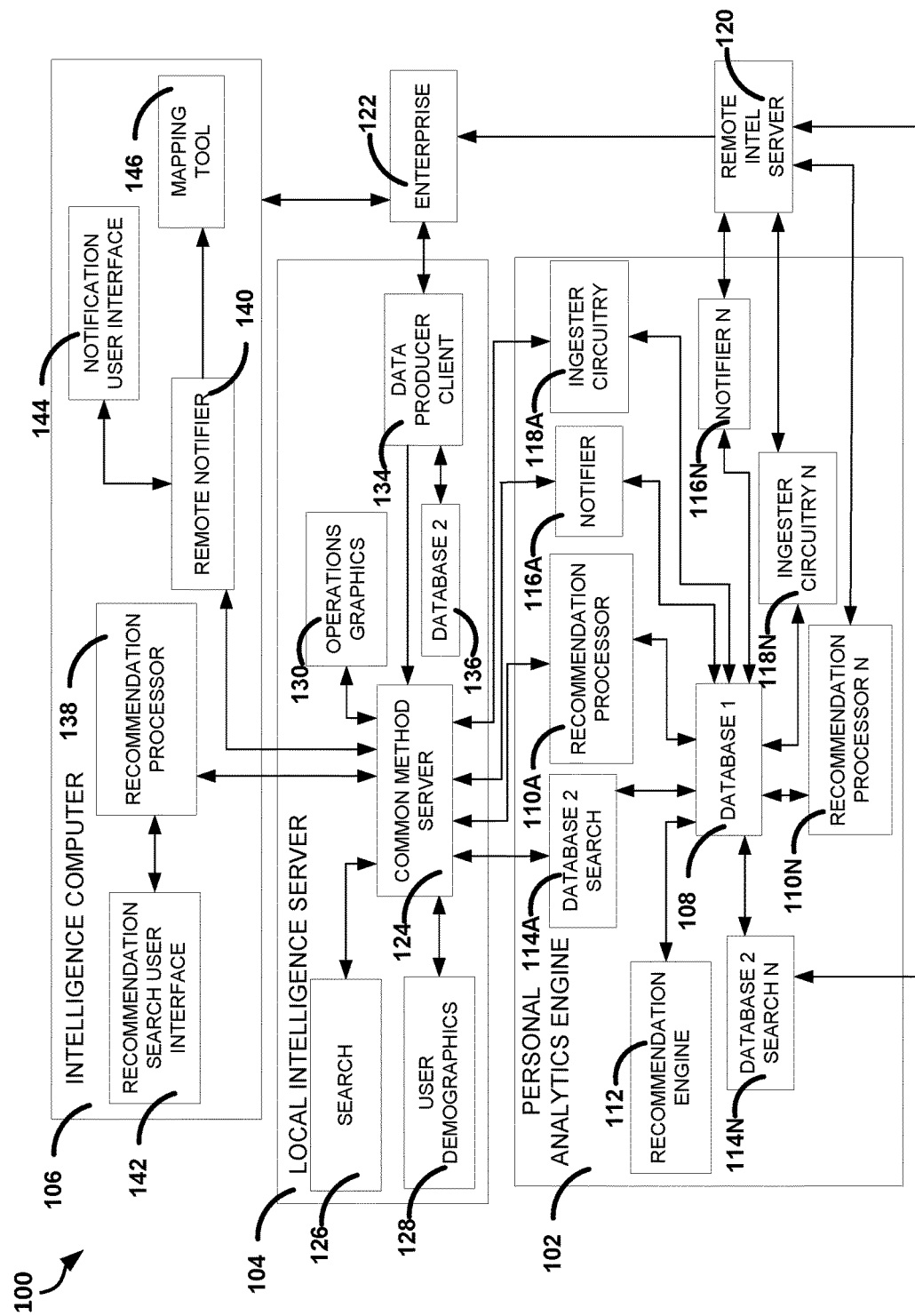
FIG. 1 illustrates, by way of example, a logical block diagram of an embodiment of a system for providing a recommendation and/or notification to an end user's device.

FIG. 1 illustrates, by way of example, a logical block diagram of an embodiment of a system 100 for providing a recommendation and/or notification to an end user's device. The system 100 as illustrated includes a personal analytics engine 102 coupled to one or more end user devices (e.g., tablet(s) or other mobile devices), end user devices not shown in FIG. 1.

The system 100 as illustrated includes the personal analytics engine 102 communicatively coupled to an intel server 104. The intel server 104 is communicatively coupled to an intelligence computer 106. The intel server 104 can be geographically close to the intelligence computer 106.

The personal analytics engine 102 includes a database 108 that receives data from multiple data sources. The database 108 can be queried, such as by recommendation processor circuitry 110A and/or 110N, recommendation engine 112, database search circuitry 114A and/or 114N, notifier circuitry 116A and/or 116N, and/or ingester circuitry 118A and/or 118N, such as to perform operations for determining a recommendation (if any) to be provided to analytics personnel (personnel that use the intelligence computer 106) that can vet the recommendation.

In one or more embodiments, the personal analytics engine 102 can be distributed, such as to include a personal analytics engine for a specific geographical region (e.g., building, such as a forward operating base, county, province, country, or the like) or subset of user devices (e.g., one or more officers, corporals, cadets, generals, or other end users can include a dedicated personal analytics engine 102). Distributed personal analytics engines can be communicatively coupled, such as to form a distributed personal analytics engine for a larger region. The personal analytics engine 102 can monitor how an analyst is using tools (e.g., one or more components of the system 100) to provide recommendations to the end user. The personal analytics engine 102 can provide data gathered regarding the analyst usage to a remote intel server 120, such as can connect personal analytics engines to form a regional personal analytics engine. The database 108 can be populated from data from the regional personal analytics engine, such as to provide a more comprehensive view of how analysts are using the tools. The data can help train the personal analytics engine 102 to recognize when data indicates that a situation exists in which an analyst is likely to issue a recommendation to an end user.

For example, the database search circuitry 114A, recommendation processor circuitry 110A, notifier circuitry 116A, and ingester circuitry 118A can be local to an end user and the database search circuitry 114N, recommendation processor circuitry 110N, notifier circuitry 116N, and ingester circuitry 118N can populate the database 108 with data from a personal analytics engine remote to the end user, such as through the remote intel server 120. For example, a personal analytics engine can be set up for each forward operating base and each forward operating base in a specified region can be communicatively coupled, such as to provide recommendations consistent across a larger region than that served by the personal analytics engine 102.

The database 108 can include data detailing users registered with the system 100, products which the users use, reports regarding missions carried out by the users, prior recommendations provided by the analysts to the respective users, or future recommendations to be provided to the analyst(s) for vetting, and/or demographics of the users.

The recommendation processor circuitry 110A-110N filters through data on the database 108. The recommendation processor circuitry 110A-110N can provide recommendations to the CMS 124 based on the filtered data.

The recommendation engine 112 provides vetted recommendations to a mobile device connected thereto. The recommendation engine 112 provides circuitry configured for allowing an end user to search the database 108.

The database search circuitry 114A-114N provides queries to a common message server (CMS) 124 or a remote intel server 120. The notifier circuitry 116A-116N can provide a communication to the CMS 124 indicating that a recommendation is being provided to the analyst, such as by the recommendation processor circuitry 110A-110N. The ingester 118A-118N monitors tool usage by analysts coupled through the intel server 104.

The recommendation can be provided to an intel server 104. A vetted recommendation can be provided to an end user device. The recommendation can be provided to an end user device that is registered as described in FIG. 5. In one or more embodiments, the recommendation can be provided over a disadvantaged or disadvantaged with intermittent latency (D/DIL) connection.

The intel server 104 as illustrated includes elastic search circuitry 126, user demographics memory 128, operations graphics circuitry 130, directory monitor circuitry 132, a data producer circuitry 134, and another database 136 communicatively coupled to the CMS 124.

The CMS 124 is a server that performs operations of a publish/subscribe message hub. The CMS 124 can monitor network conditions between devices (e.g., end user devices, the personal analytics engine 102, the intel server 104, and/or the intelligence computer 106). The CMS 124 can route recommendations, notifications, or other communications, such as queries, responses, get requests, put requests, or the like, to one or more communication channels. The chosen communication channel can be based on the network conditions (e.g., packet loss, latency, bandwidth, or the like), the type of communication, an urgency associated with the communication, or the like. The chosen communication channel can include a transmission control protocol (TCP), internet protocol (IP), and/or a user datagram protocol (UDP) channel. UDP is generally lower latency and includes less packet loss than a TCP or IP channel.

The search circuitry 126 carries out and manages standing queries. The search circuitry 126 can receive communications indicating to update, delete, or create a standing query and details of the standing query (e.g., time between queries, who is to receive the results, or the like). In one or more embodiments, the search circuitry 126 can be implemented using an open source tool. Elasticsearch.

The user demographics memory 128 includes data regarding age, rank, position, tools, location, mission, mission objective, tasks, permissions, or the like of end users and/or analysts. In one or more embodiments, the user demographics memory 128 can be implemented using Active Directory from Microsoft Corporation of Redmond, Wash. United States.

The operations graphics circuitry 130 fuses tools used by end users and/or analysts with a map of a geographic area. The fused map can include a view of tools on the map at a location corresponding to where the tool is being used. The fused map can include a view of data being transmitted by the tools one the map. The map can be provided to an analyst with a recommendation, such as on demand or with a recommendation to be vetted, such as can help the analyst determine whether or not to approve or deny the recommendation.

The data producer circuitry 134 provides data regarding tools used by an end user or analyst from the database 136 to the CMS 124. The data regarding the tools can include a communication protocol supported by the tools, a frequency to be used in communicating with the tools, capabilities of the tools, such as can include whether the tools support text messaging, video streaming, photographs, voice calls, internet communication, virtual reality, or the like. The database 136, in one or more embodiments, the database 136 can include a directory information base (DIB) database. The database 136 can be a distributed database, in one or more embodiments.

The data producer circuitry 134 can provide data from the database 136 to the enterprise circuitry 122 and/or the CMS 124. The enterprise circuitry 122, in one or more embodiments, can include a defense intelligence information enterprise. The enterprise circuitry 122 can transform data collected into one or more forms suitable for further action or analysis, such as by an analyst using the intelligence computer 106, for example. The enterprise circuitry 122 can provide an ability to integrate, evaluate, interpret, and/or predict a physical environment and/or state of a mission, such as to provide intelligence information that provide situational awareness to the analyst.

The intelligence computer 106 as illustrated includes recommendation processor circuitry 138, remote notifier circuitry 140, a recommendation search user interface (UI) 142, an notification UI 144, and a mapping circuitry 146. The recommendation processor circuitry 138 receives recommendations from the CMS 124 and requests data from the CMS 124. The recommendation processor circuitry 138 receives requests from the recommendation search UI 142, such as for data associated with a recommendation. The request form the recommendation search UI 142 can include a request for a map, such as from the operations graphics circuitry 130, user demographics, such as from the user demographics memory 128, tools, mission data, weather data, personnel location data, or the like such as from the database 136 or the enterprise circuitry 122. This data can be presented to the analyst, such as through the recommendation search UI 142. Using the recommendation search UI 142, the analyst can approve, deny, or modify a recommendation. A communication indicating whether the recommendation was rejected, approved, modified, how it was modified, an analyst identification associated with the approval, denial or modification, or the like can be provided to the CMS 124, which can forward the indication to the database 108. The indication can be used by the recommendation processor circuitry 110A-110N in providing a future recommendation. The recommendation search UI 142 and notification UI 144 can be implemented using Hyperion from Raytheon Company.

The remote notifier circuitry 140 provides notifications for an analyst's consideration, such as through the notification UI 144. The notifier circuitry can receive notifications from the notifier circuitry 116A-116N, such as through the CMS 124. A notification is different from a recommendation in that a recommendation is produced as a prediction and the notifier is produced in response to a defined set of circumstances becoming reality, such as can be based on a policy or a set of rules stored in the database 108. The recommendation is a guess, by the personal analytics engine 102, as to what data an analyst may want to present to an end user. The notification is data that the end user definitely needs to be aware of. The notification is provided, by the notifier circuitry 116A-116N, in response to occurrence of a predefined set of circumstances. For example, a policy can indicate that if end user A captures an image, end user B is to be given a copy of the captured image. Thus, if an image is provided to the personal analytics engine 102 that is from end user A, a notification including the image can be provided to end user B, such as using the system 100.

The mapping circuitry 146 is similar to the operations graphics circuitry 130. It provides the analyst with a view of a geographic area, such as can be overlaid with one or more objects that indicate a location of a tool, a communication source or destination, end user, other resources related to a mission, or the like. The mapping circuitry 146 can help inform the analyst of a situation on the ground, water, and/or air as it relates to providing a notification and/or recommendation.

Figure 2:
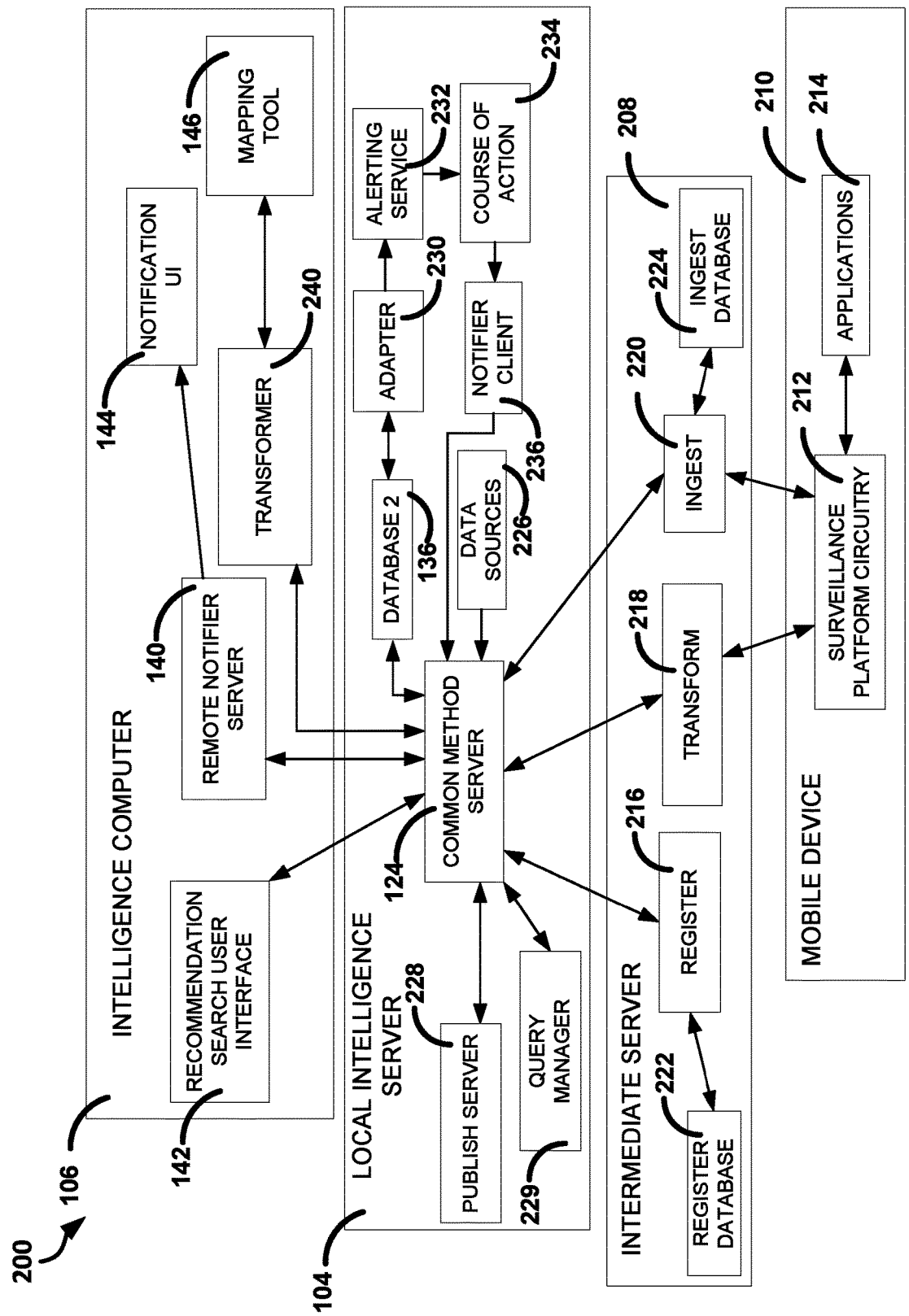
FIG. 2 illustrates, by way of example, a logical block diagram of an embodiment of a system for providing a recommendation and/or notification to an end user's mobile device.

FIG. 2 illustrates, by way of example, a logical block diagram of an embodiment of a system 200 for providing a recommendation and/or notification to an end user's mobile device 210. The system 200 includes components that can be used in addition to or alternative to components of the system 200. The system 200 similar to the system 100 with a mobile device 210 coupled to the local intel server 104 by way of an intermediate server 208. The connections and components illustrated in FIG. 2 (and not in FIG. 1) are additional or alternative connections to those of the system of FIG. 1.

The mobile device 210 includes surveillance platform circuitry 212 and one or more applications 214 communicatively coupled to the CMS 124, such as through the intermediate server 208. In one or more embodiments, the surveillance platform circuitry can be implemented using Gotham™, a product produced by Blackbird Technologies of Herndon, Va., United States, which is currently owned by Raytheon Company. The surveillance platform circuitry 212 provides real-time situational awareness (SA) to the end user. The surveillance platform circuitry 212 can provide asset tracking by consolidating position, status, and/or message information. The surveillance platform circuitry 212 can enable communication with two-way-communication capable units, such as the intermediate server 208. The surveillance platform circuitry 212 provides a centralized communications hub for a connected architecture and can serve as a common operating picture for third-party devices. The surveillance platform circuitry 212 receives information from the local intel server 104 via the intermediate server 208 and provides data to the local intel server 104 via the intermediate server 208. The local intel server 104 uses the data from other systems to update the surveillance platform circuitry 212 and provides data that can be used to provide a personal notice to the mobile device 210.

The intermediate server 208 as illustrated includes register circuitry 216, transform circuitry 218, and ingest circuitry 220. The register circuitry 216 performs operations of a registration/deregistration process. The registration process can provide the mobile device 210 with communication with the intelligence computer 106. The register circuitry 216 can associate a mobile device 210 with an end user. The register circuitry 216 can perform operations for associating/de-associating an analyst with a specific mobile device. Examples of operations that can be performed by the register circuitry 216 are provided in FIGS. 10 and 11.

The transform circuitry 218 formats communications from the local intel server 104 into a form compatible with the mobile device 210. The transform circuitry 218 formats communication from the mobile device into a form compatible with the local intel server 104. The ingest circuitry 220 receives data from the surveillance platform circuitry 212 and/or the CMS 124. The ingest circuitry 220 can store the data received on the ingest database 224, such as can be accessible by the personal analytics engine 102.

The register database 222 includes data associated with registration of the mobile devices 210 and which analyst(s) and user(s) are associated with the mobile device 210. The register database 222 can be queried to determine whether a user is permitted to communicate to the local intel server 104.

The local intel server 104 as illustrated includes the CMS 124 communicatively coupled to data sources 226, publish server 228, query manager circuitry 229, adapter circuitry 230, alerting service circuitry 232, course of action circuitry 234, and notifier circuitry 236. The data sources 226 can provide data uploaded from the user (such as through the mobile device), analyst (such as through the notification or recommendation UI), or adapted from another intelligence system. The adapter circuitry 230 transforms data from the database 136 into a form compatible with the alerting service circuitry 232. The alerting service circuitry 232 monitors data from the database 136, such as through one or more queries, to determine whether one or more conditions (sometimes referred to as circumstances) required for providing a notification to the mobile device 210 are satisfied. In response to determining the one or more conditions are satisfied, the alerting service circuitry 232 can provide an indication to the course of action circuitry 234. The course of action circuitry 234 can determine whether one or operations are to be included in a notification to the mobile device 210. The operations can be acts to be performed by the user of the mobile device 210. The notification can include the operations and/or an indication that the conditions have been satisfied, such as can include an indication of the condition(s) that were satisfied. The operations can additionally, or alternatively, be operations to be performed by the notifier circuitry 236. CMS 124, and/or analyst. In one or more embodiments, the alerting service circuitry 232 can be implemented using Intersect Sentry™ from Raytheon Company.

The notifier circuitry 236 provides a notification to the CMS 124, such as can be based on the operations from the course of action circuitry 234 and/or an output from the alerting service circuitry 232. The notification can include data identifying one or more analyst(s) and/or end user(s) that are to receive the notification. The CMS 124 can forward the notification to the identified recipient(s) of the notification.

The publish server 228 can record data to be provided to the mobile device 210 in a database, such as the database 136 or other database. The publish server 228 can perform operations, such as can include communications as detailed in FIG. 5.

The query manager circuitry 229 can perform operations for executing queries, such as standing queries. The queries can be for data requested by the analyst and/or the end user. The query manager circuitry 229 can perform operations, such as can include communications as detailed in FIGS. 12, 13, and/or 14.

The CMS 124 can be communicatively coupled to components of the intelligence computer 106, such as can include the components of the intelligence computer 106 of FIG. 1, and additionally, or alternatively, a data transform circuitry 240. The transform circuitry 240 can transform data from the CMS 124 into a format compatible with the mapping circuitry 146. The transform circuitry 240 can transform data from the mapping circuitry 146 into a format compatible with the CMS 124.

Figure 3:
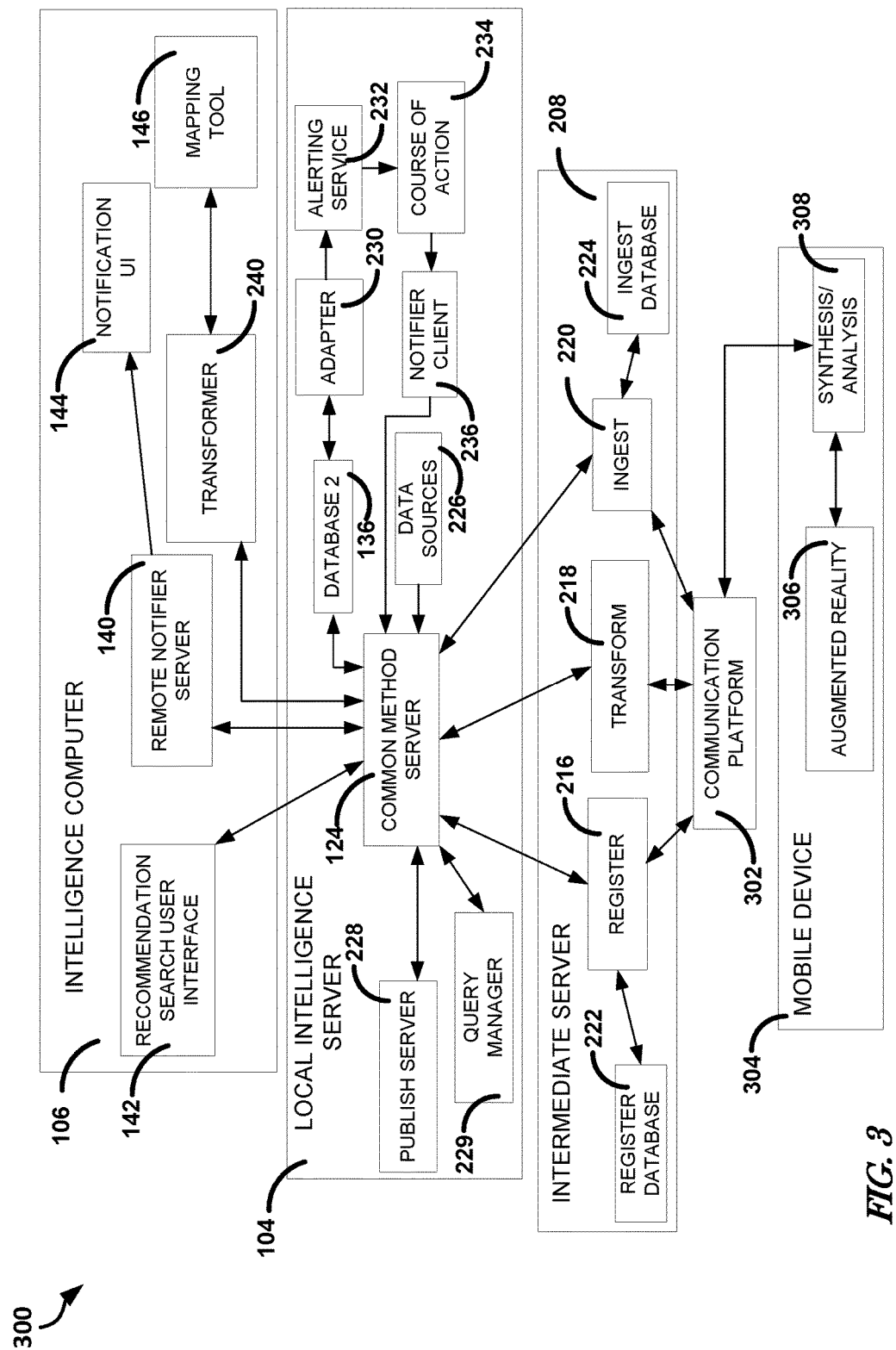
FIG. 3 illustrates, by way of example, a logical block diagram of another embodiment of a system for providing a recommendation and/or notification to an end user's mobile device.

FIG. 3 illustrates, by way of example, a logical block diagram of another embodiment of a system 300 for providing a recommendation and/or notification to an end user's mobile device 304. The system 300 is similar to the systems 100 and 200 with a mobile device connected to the local intel server 104 by way of communication platform 302, such as can include a network operations center (NOC). The communication platform 302 provides a variable message format capability, such as to allow multiple types of end user devices to connect to the intel server 104 and/or to allow an analyst to provide communications to the mobile device 304 in a variety of formats. The connections illustrated in FIG. 3 are additional or alternative connections to those of the systems of FIGS. 1 and/or 2.

The mobile device 304 as illustrated includes augmented reality circuitry 306, such as can include augmented reality goggles, glasses, or the like. The augmented reality circuitry 306 can provide an end user with a real-time view of their current environment, such as by using a camera of the augmented reality circuitry 306, augmented by objects overlaid on the view provided by the camera. The augmented reality objects can be provided by the synthesis/analysis circuitry 308. The synthesis/analysis circuitry 308 can add a view of a recommendation or notification from the analyst as an augmented reality object. The synthesis/analysis circuitry 308 can provide the end user with the operations to be performed in response to the notification or recommendation, such as can be provided by the course of action circuitry 234.

In one or more embodiments, the communication platform 302 can be implemented using a joint battle command platform (JBC-P). The communication platform 302 can facilitate transfer of text messages, video, voice messages, or other communications to/from the mobile device 304 from/to the CMS 124, notifier circuitry 236, and or intelligence computer 106.

Figure 4:
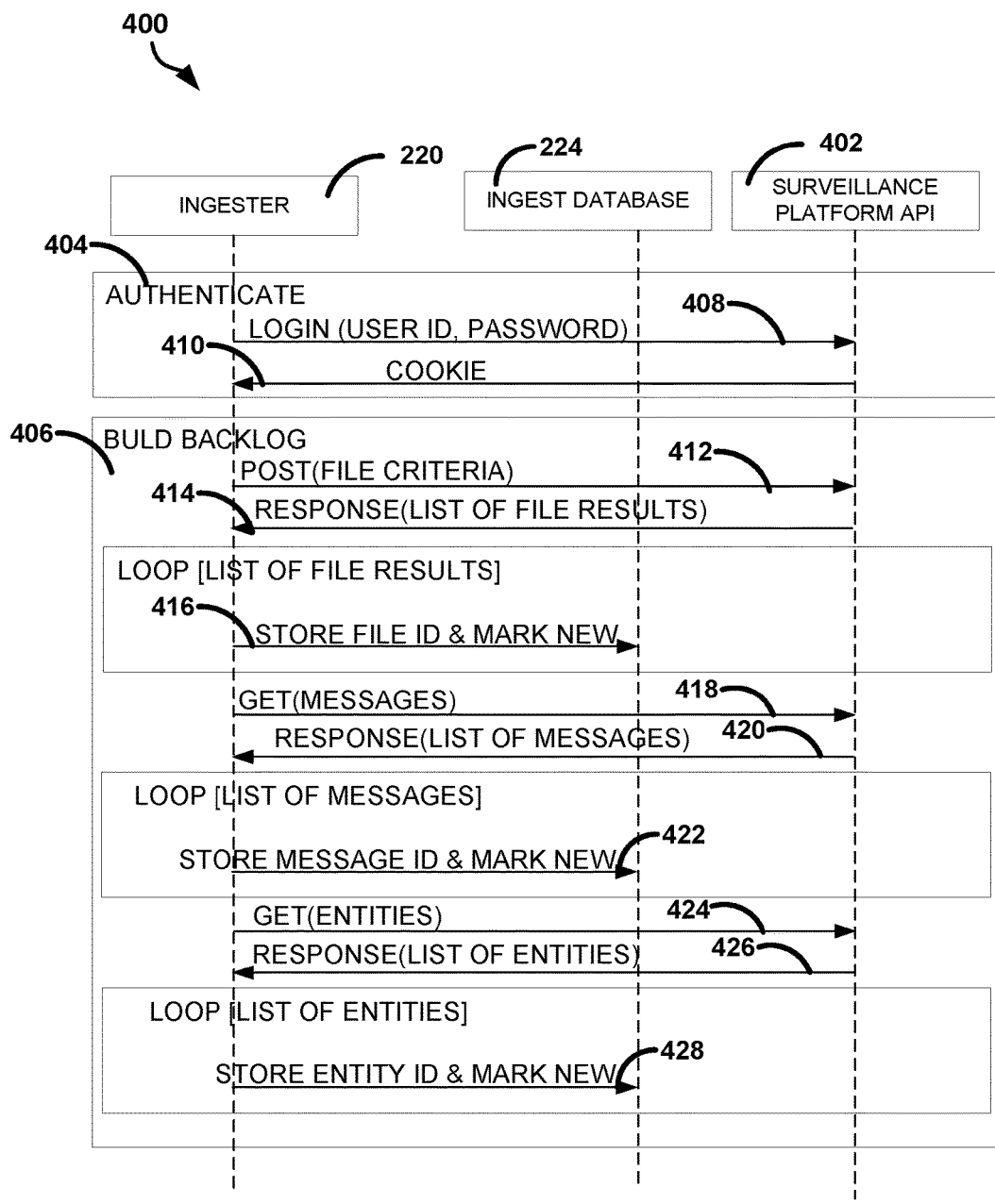
FIG. 4 illustrates, by way of example, a communication diagram of an embodiment of communications for queuing communications from an end user's mobile device.

FIG. 4 illustrates, by way of example, a communication diagram of an embodiment of operations 400 including communications for queuing communications from an end user's mobile device. The communications include user authentication and building a backlog of data for ingestion from the surveillance platform circuitry 212 into a database 224. The data in the database 224 can be transferred into a database of the local intel server 104, such as can include the database 136. The communications of FIG. 4 are between the ingester circuitry 220, the ingest database 224, and/or a surveillance platform application programming interface (API) 402, which is an API for the surveillance platform circuitry 212.

The operations 400 include authenticate operations 404 and build backlog operations 406. The authenticate operations 404 include providing a login request 408 from the ingester circuitry 220 to the surveillance platform API 402. The authenticate operations 404 include providing a cookie 410 in response to the login request 408. The cookie 410 can include data specific to the user associated with the user ID of the login request 408, such as if the user ID and password are valid. The cookie 410 can indicate whether there are one or more files, messages, and/or entities to be ingested.

The build backlog operation 406 can include operations for building a backlog of messages, a backlog of files, and/or a backlog of entities, such as can be dependent on the content of the cookie 410. Each of these operations can be similar, with variation in the type of data requested. Building a backlog of files can include providing a post request 412, from the ingester circuitry 220 to the surveillance platform API 402, for files that meet specified criteria (as specified in the post request 412). The surveillance platform API 402 can respond to the post request 412 with a response 414 that includes a list of file IDs that match the criteria specified in the post request 412. The ingester circuitry 220 can provide a communication 416 to the ingest database 224 that causes the ingest database 224 to store a file ID, such as can be marked as being new.

Building a backlog of messages can include providing a get request 418, from the ingester circuitry 220 to the surveillance platform API 402, for messages that meet specified criteria (as specified in the get request 418, such as can include messages since a last ingest). The surveillance platform API 402 can respond to the get request 418 with a response 420 that includes a list of messages that match the criteria specified in the get request 418. The ingester circuitry 220 can provide a communication 422 to the ingest database 224 that causes the ingest database 224 to store a message ID, such as can be marked as being new.

Building a backlog of entities can include providing a get request 424, from the ingester circuitry 220 to the surveillance platform API 402, for entities that meet specified criteria (as specified in the get request 424, such as can include entities registered since a last ingest). The surveillance platform API 402 can respond to the get request 424 with a response 426 that includes a list of entities that match the criteria specified in the get request 424. The ingester circuitry 220 can provide a communication 428 to the ingest database 224 that causes the ingest database 224 to store an entity ID, such as can be marked as being new.

Figure 5:
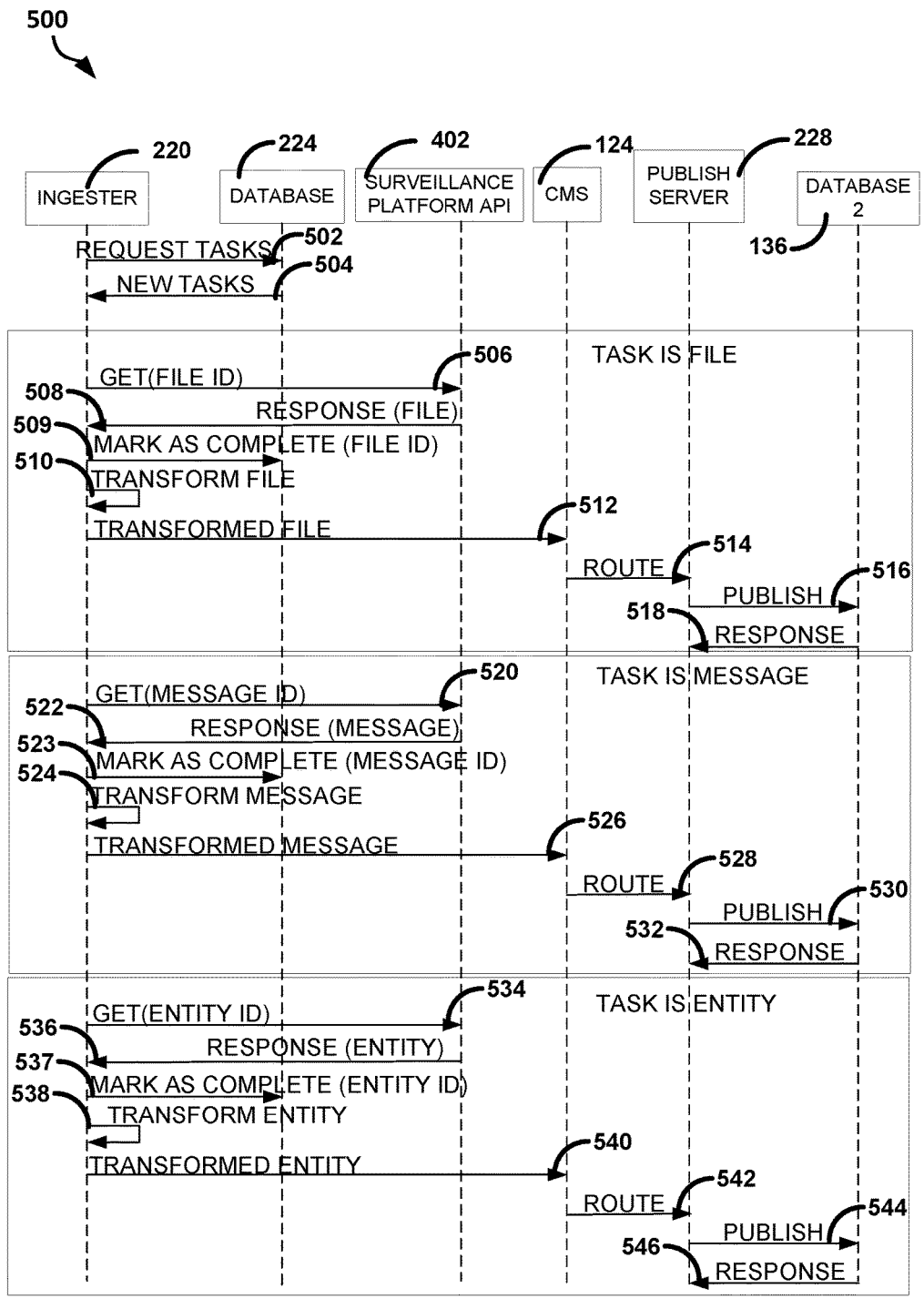
FIG. 5 illustrates, by way of example, a communication diagram of an embodiment of communications for providing a queued communication to an end user's mobile device.

FIG. 5 illustrates, by way of example, a communication diagram of an embodiment of operations 500 including communications for ingesting the backlog of data from the mobile device 210 into the database 136 of the intel server 104. The operations 500 include operations for publishing content to the database 136. The communications are between the ingester circuitry 220, the database 224, surveillance platform API 402, the CMS 124, the publish server 228, and/or the database 136.

The ingester circuitry 220 can request tasks from the database 224. The database 224 can be searched for content (e.g., files, messages, and entities) marked as new or otherwise unpublished. An ID for each piece of content marked as new can be provided to the ingester circuitry 220 from the database 224 in a new tasks response 504.

The publish content operations can include operations for publishing messages, files, and/or entities, such as can be dependent on the content of the new tasks response 504. Each of these publish operations can be similar, with variation in the type of data requested.

The ingester circuitry 220 can issue a get(content ID) request 506, 520, and/or 534 to the surveillance platform API 402. The surveillance platform API 402 can produce a response 508, 522, and/or 536 that includes the requested content associated with the content ID. In response to receiving the content, the ingester circuitry 220 can provide a request 509, 523, and/or 537 to the database 224 to mark the content associated with the content ID as complete. The ingester circuitry 220 can transform the content into a form compatible with the CMS 124 at operation 510, 524, and/or 538. The content that is in a form compatible with the CMS 124 can be provided to the CMS 124 at operation 510, 526, and/or 540.

The CMS 124 can route the content to the publish server 228 at operations 514, 528, and/or 542. The publish server 228 can publish the content in the database 136 at operation 516, 530, and/or 544. The database 136 can provide a response 518, 532, and/or 546 indicating whether publication was successful or unsuccessful (such as can include an explanation of why the request was unsuccessful).

Figure 6:
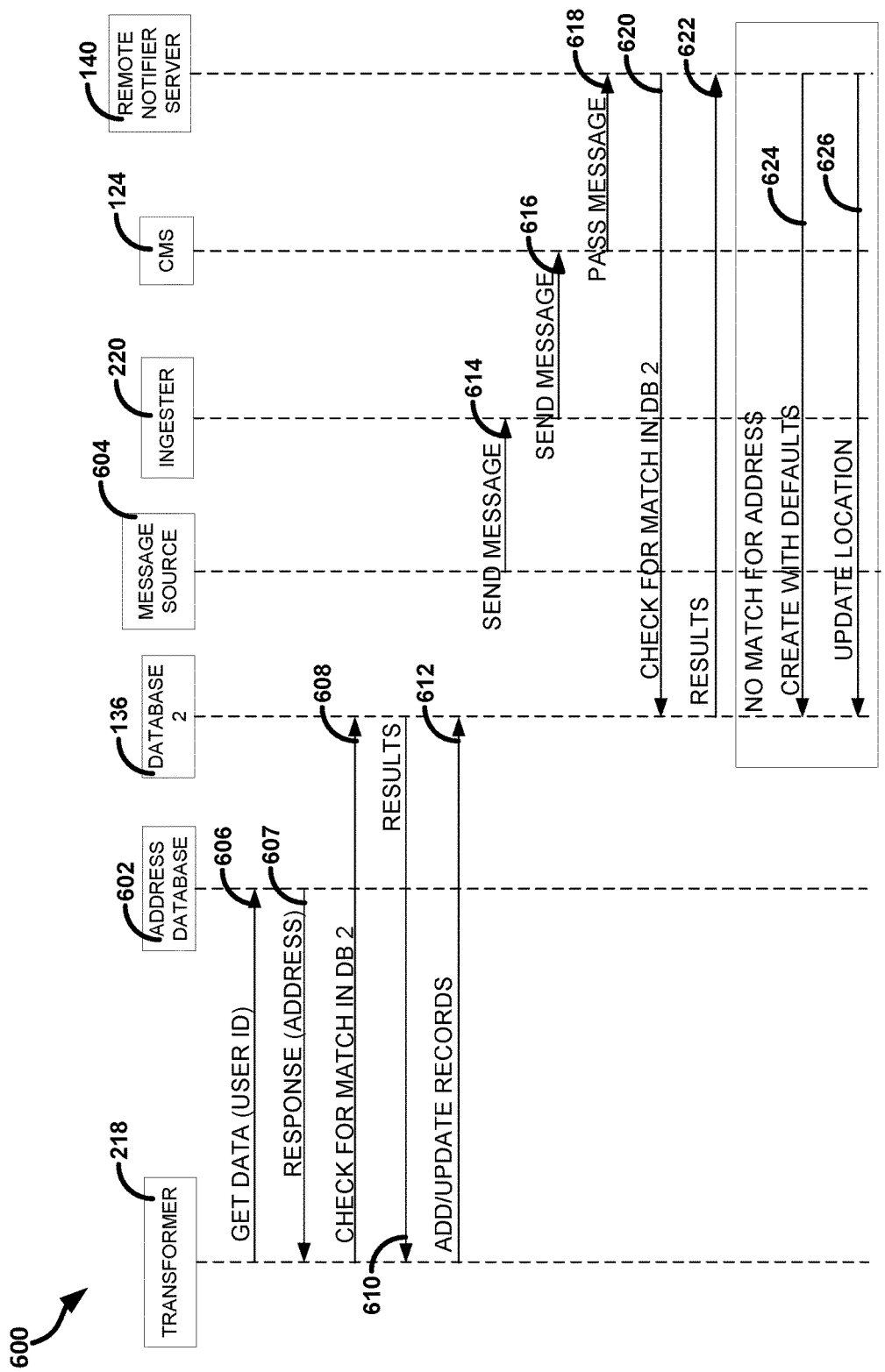
FIG. 6 illustrates, by way of example, a communication diagram of an embodiment of communications for processing a specific message type.

FIG. 6 illustrates, by way of example, a communication diagram of an embodiment of operations 600 including communications for processing a specific message type (e.g., a K05.01 message). The alternative messages provide a parallel path to the surveillance platform circuitry 212 for data to come into the intel server 104. Note that K05.01 messages are merely examples of messages that can be consumed using the operations 600. The operations 600 include communications between the transform circuitry 218, an address database 602, the database 136, a message source 604 (e.g., the mobile device 210 or other device capable of producing such a message), the ingester circuitry 220, the CMS 124, and/or the remote notifier circuitry 140. The address database 602 can be a part of the intermediate server 208.

A get data request 606 can be provided from the transform circuitry 218 to the address database 602. The address database 602 can include details regarding address(es) (e.g., channels) through which a user communicates, such as can be based on the provided user ID. The address database 602 can provide a response 607 that indicates the address through which the user associated with the request 606. The transform circuitry 218 can check for a match to the address from the response 607 by providing a request 608 to the database 136. The database 136 can indicate in a response 610, the results of determining if there is a match. If there is no match, the transform circuitry 218 can provide a request 612 to the database 602 that causes the database 136 to update its records to reflect the address, such as to create a match.

The message source 604 can provide a message 614 to the ingester circuitry 220. The ingester circuitry 220 can forward the message to the CMS 124, such as at operation 616. The CMS 124 can pass the message to the remote notifier circuitry 140. An analyst can view the message, such as through the notification UI 144. The remote notifier circuitry 140 can provide a request 620 to the database 136 to determine if there is a match for the address/user data of the message. The database 136 can provide a response 622 indicating the address and user ID, such as to allow the remote notifier circuitry 140 to determine if there was a match. If there is a match, then the remote notifier circuitry 140 can provide the message to the analyst, such as through the notification UI 144. If there is no match for the address, the remote notifier circuitry 140 can initiate creation of an entry that does match, such as by creating a request 624 to create the entry with default data, the address, and/or the user ID. The remote notifier circuitry 140 can provide a request 626 to the database 136 that causes the database 136 to update the created entry with a location of the message source 604, as indicated by the message.

Figure 7:
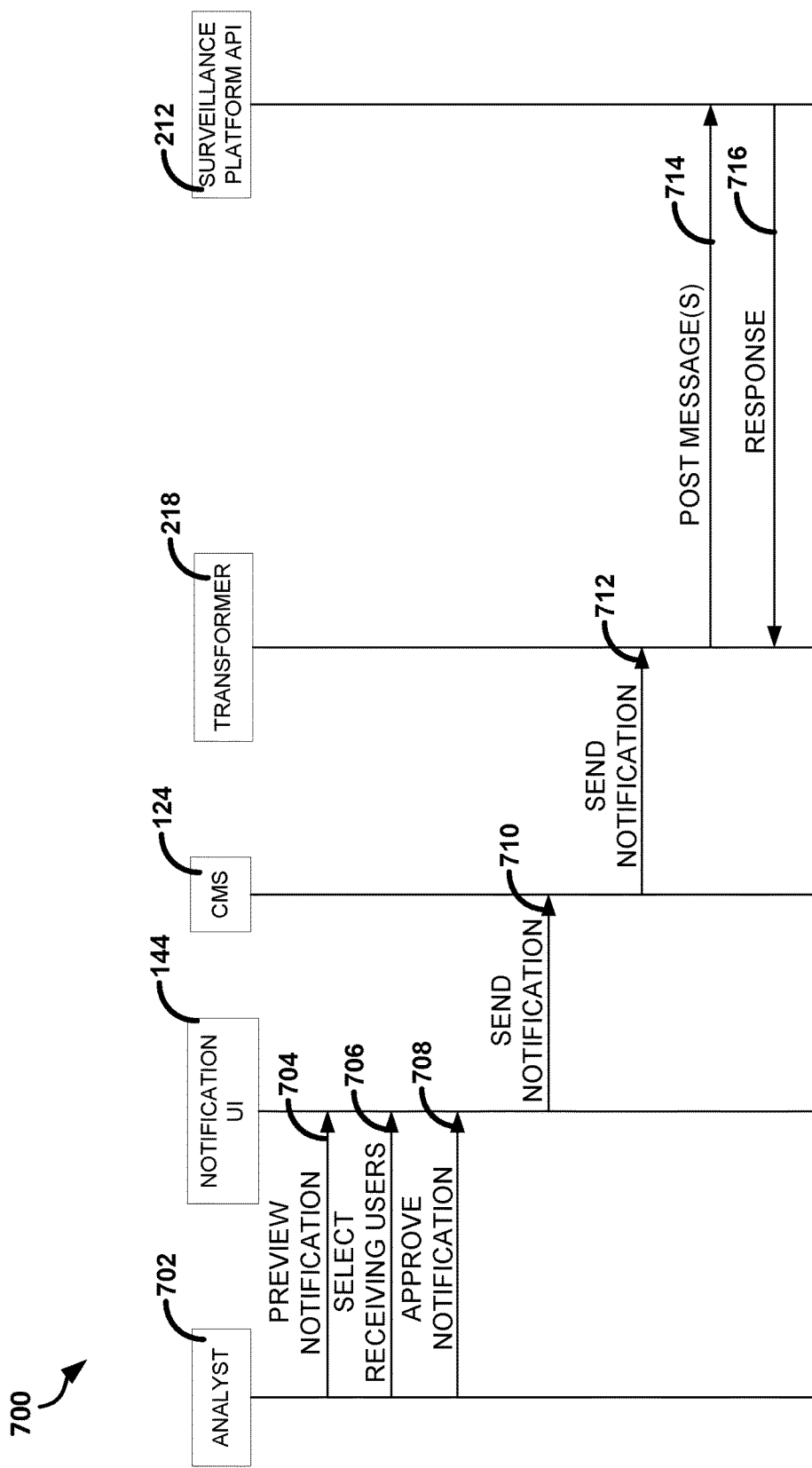
FIG. 7 illustrates, by way of example, a communication diagram of an embodiment of communications for providing a notification to an end user's mobile device.

FIG. 7 illustrates, by way of example, a communication diagram of an embodiment of operations 700 including communications for providing a notification to an end user's mobile device 210, such as through the surveillance platform CIRCUITRY 212. The operations 700 include communications between an analyst 702, the notification UI 144, the CMS 124, the transform circuitry 218, and the surveillance platform CIRCUITRY 212. The analyst 702 can provide a request 704 to the notification UI 144 to preview the notification, such as by selecting the notification through the notification UI 144. The notification UI 144 can provide the analyst 702 with a view of the notification, such as through a display of the intelligence computer 106. After vetting the notification, the analyst 702 can select receiving users using a request 706, such as by selecting the receiving users using the notification UI 144. The analyst 702 can provide an indication that the notification is approved for the selected receiving users using a request 708, such as by selecting an approve control through the notification UI 144.

The notification UI 144, in response to receiving the request 708, can provide a send notification request 710 to the CMS 124. The send notification request 710 can include user IDs and/or addresses of users to receive the notification. The CMS 124 can route the send notification request 710 to the proper transform circuitry 218, such as by issuing another send notification request 712. The transform circuitry 218 can provide a post message(s) request 714 to the surveillance platform CIRCUITRY 212. The message(s) of the post message(s) request 714 can include the notification from the send notification request 712. The surveillance platform CIRCUITRY 212 can provide a user of the mobile device 210 with a view of the notification. The surveillance platform CIRCUITRY 212 can provide a response 716 to the transform circuitry 218, such as can include an indication as to whether the notification was provided to the user or not.

Figure 8:
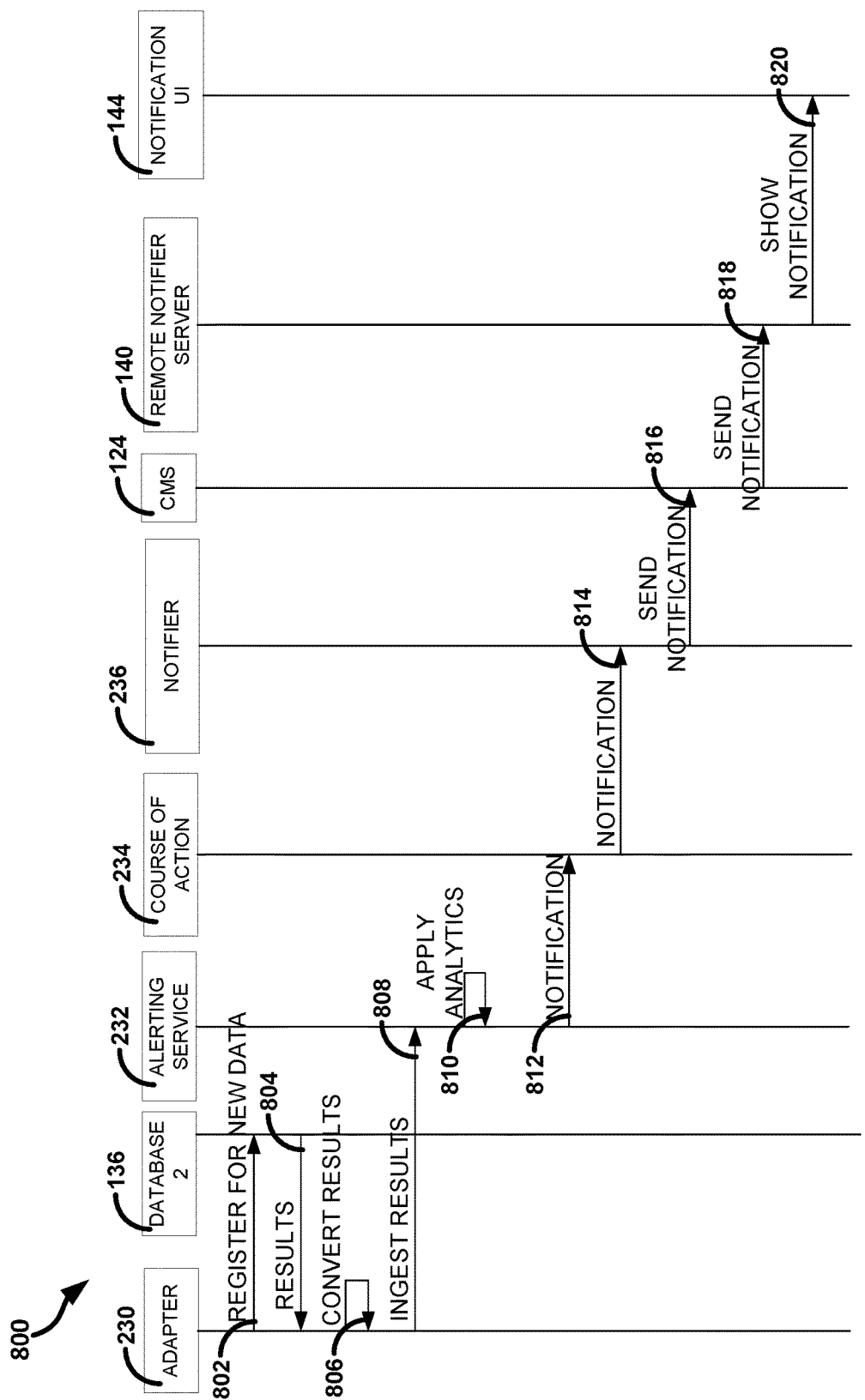
FIG. 8 illustrates, by way of example, a communication diagram of an embodiment of communications for applying an analyst agent and providing a notification to an analyst.

FIG. 8 illustrates, by way of example, a communication diagram of an embodiment of operations 800 including communications for notification and/or other event processing. Generally, the notification and event processing provide a user with intel regarding what happened, where it happened, what time it happened, why it is important, and/or ramifications of the event or notification. The alerting service circuitry 232 performs, in part, the event and notification processing. The alerting service circuitry 232 can provide a notification that can be forwarded to an analyst, such as through the notification UI 144, if a match is found. The alerting service circuitry 232, in one or more embodiments, can include an activity-based intelligence (ABI) analytics and automation solution. The alerting service circuitry 232 can provide real-time, automated decision support capabilities to help analysts identify the most relevant information in the data available to the analyst. The operations 800 include communications between the adapter circuitry 230, the database 136, the alerting service circuitry 232, the course of action circuitry 234, the remote notifier circuitry 236, the CMS 124, the remote notifier circuitry 140, and/or the notification UI 144.

The adapter circuitry 230 can issue a request 802 to the database 136 for data related to a notification. The database 136 can provide a response 804 to the request 802 that includes results of the request 802, such as can be gathered using a query to the database 136. The adapter circuitry 230 can transform the results, at operation 806, into a form compatible with the alerting service circuitry 232. The alerting service circuitry 232 can apply analytics to determine whether a notification is to be issued to an end user, such as at operation 810. The analytics can include determining if a notification is to be issued based on one or more rules or policies. In response to determining the ingested results, such as from operation 808, satisfy conditions defined in the one or more rules or policies, the alerting service circuitry 232 can issue a notification to the course of action circuitry 234, at operation 812. The course of action circuitry 234 can add operations to be performed to the notification. The notification (with the added operations) can be provided to the notifier circuitry 236, at operation 814.

The notifier circuitry 236 can provide a request 816 to the CMS 124 to send the notification from the course of action circuitry 234 to an end user device. The CMS 124 can forward the notification to the local intelligence computer 106 (e.g., the remote notifier circuitry 140), using the request 818. An analyst can be provided with a view of the notification, at operation 820, such as by using the notification UI 144. The operations 700 and/or 900 can performed after the operations 800.

Figure 9:
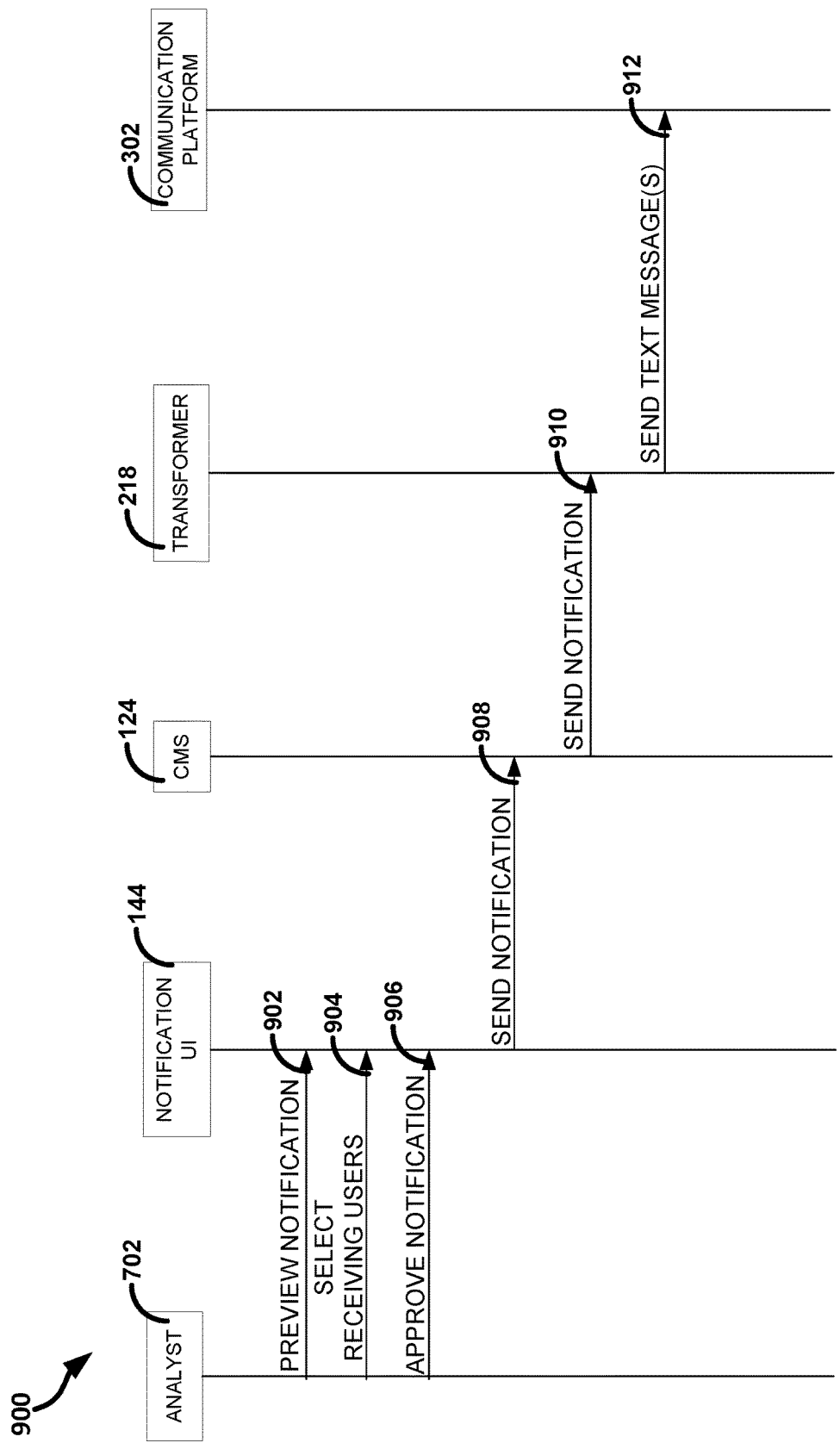
FIG. 9 illustrates, by way of example, a communication diagram of an embodiment of communications for providing a text message to an end user's mobile device.

FIG. 9 illustrates, by way of example, a communication diagram of an embodiment of operations including communications for providing a text message to an end user's mobile device. The operations include an approval process that allows approval for a notification to be forwarded to one or more mobile devices, such as through the communication platform 302, such as from an HMI (human machine interface). A user may need to approve a notification before it is provided to the mobile device. The operations 900 are similar to the operations 700 with the operations providing a mobile device a notification through the communication platform (by way of text message) rather than through the surveillance platform circuitry 212. The operations 900 can include communications between the analyst 702, notification UI 144. CMS 124, transform circuitry 218, and/or the communication platform 302.

The analyst 702 can provide a request 902 to the notification UI 144 to preview the notification, such as by selecting the notification through the notification UI 144. The notification UI 144 can provide the analyst 702 with a view of the notification, such as through a display of the intelligence computer 106. After vetting the notification, the analyst 702 can select receiving users using a request 904, such as by selecting the receiving users using the notification UI 144. The analyst 702 can provide an indication that the notification is approved for the selected receiving users using a request 906, such as by selecting an approve control through the notification UI 144.

The notification UI 144, in response to receiving the request 906, can provide a send notification request 908 to the CMS 124. The send notification request 908 can include user IDs and/or addresses of users to receive the notification. The CMS 124 can route the send notification request 908 to the proper transform circuitry 218, such as by issuing another send notification request 910. The transform circuitry 218 can provide a post message(s) request 912 to the surveillance platform CIRCUITRY 212. The message(s) of the post message(s) request 912 can include the notification from the send notification request 910. The surveillance platform CIRCUITRY 212 can provide a user of the mobile device 210 with a view of the notification.

Figure 10:
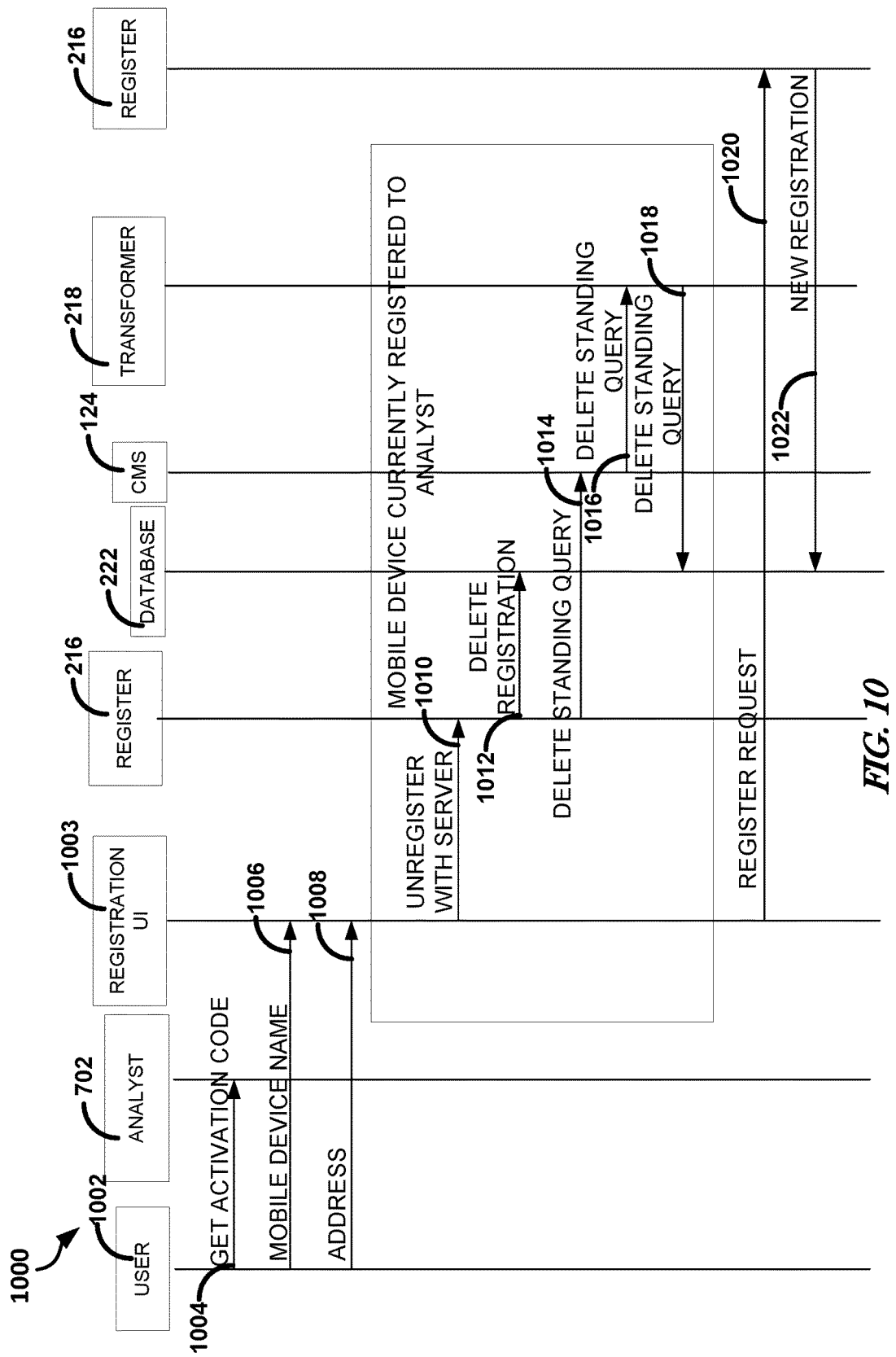
FIG. 10 illustrates, by way of example, a communication diagram of an embodiment of communications for registering an end user's mobile device with a recommendation and/or notification system.

FIG. 10 illustrates, by way of example, a communication diagram of an embodiment of operations 1000 including communications for registering an end user's mobile device with a recommendation and/or notification system, such as the system 100, 200, and/or 300. The operations 1000 can include communications between an end user 1002, the analyst 702, a registration UI 1003, the register circuitry 216, the database 222, the CMS 124, the transform circuitry 218, and/or the register circuitry 216. The end user 1002 is a person who uses the mobile device 210. The registration UI 1003 is a part of the register circuitry 216, with which the analyst 702 can interact.

The user 1002 can provide an activation code request 1004 to the analyst, such as by using the mobile device 210 to provide the request 1004 to the intermediate server 208. Analyst 702 can either approve or deny the activation code request 1004. If the analyst 702 approves the request and activation code can be provided to the user 1002, such as through the intermediate server 208. If the analyst 702 denies the request, a communication indicating that the request was denied can be provided to the user 1002. The user 1002 can generate a registration request, such as can include the activation code from the analyst 702, the name of a mobile device to which the analyst 702 will provide notifications and/or recommendations, an address of the mobile device, a user ID (of the analyst or a user of the mobile device), a password, or the like, such as at operations 1006 and/or 1008.

If the mobile device is currently registered to a different analyst, the registration UI can generate a request 1010 to unregister the device with the current analyst. The register circuitry 216 can receive the request 1010 and produce a request 1012 to delete the current registration in the database 222. Any standing queries related to the mobile device, such as can be generated by the analyst and/or the user of the mobile device, can be deleted, such as by issuing a request 1014 to the CMS 124. The CMS 124 can provide the request 1014 to the transform circuitry 218, such as by providing the request 1016. The transform circuitry 218 can transform the request 1016 to a form compatible with the database 222. The database 222 can receive a request 1018 to delete the standing query.

After issuing the request 1018 or in response to determining the mobile devise is not currently registered to another analyst, the registration UI 1003 can generate a register request 1020 to the register circuitry 216. The register circuitry 216 can record the new registration in the database 222, such as by issuing the request 1022.

Figure 11:
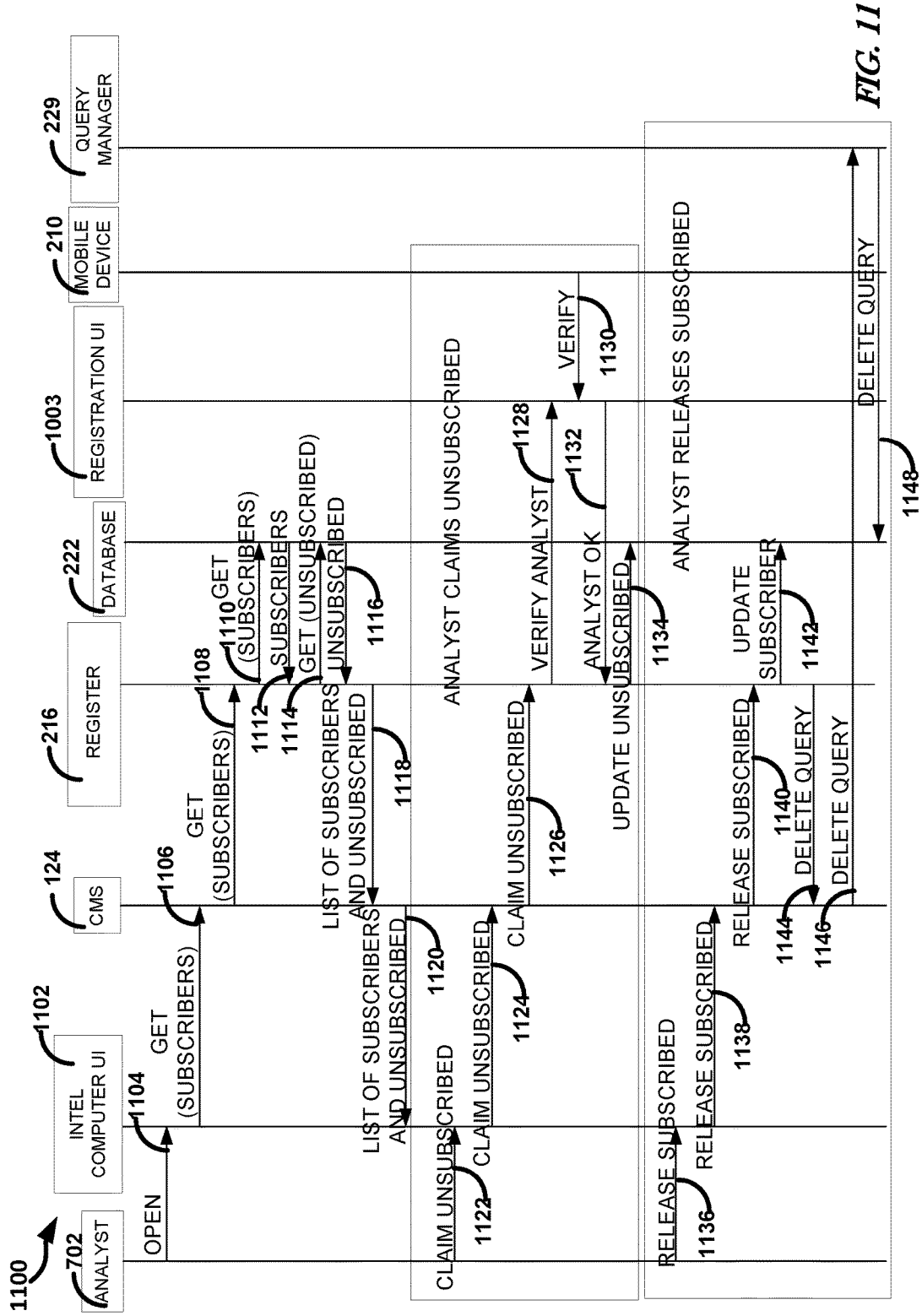
FIG. 11 illustrates, by way of example, a communication diagram of an embodiment of communications for an analyst picking up or removing a subscriber.

FIG. 11 illustrates, by way of example, a communication diagram of an embodiment of operations 1100 including communications for an analyst picking up or removing a subscriber (an end user registered with the system 100, 200, and/or 300). The operations 1100 can include communications between the analyst 702, intel computer UI 1102, the CMS 124, the register circuitry 216, the database 222, the registration UI 1003, the mobile device 210, and/or the query manager circuitry 229. The intel computer UI 1102 is a UI that the analyst 702 can interact with in claiming a subscriber. Claiming a subscriber means that the analyst will be associated with handling the notification and recommendation vetting for the user.

The analyst 702 can provide an open request 1104 to the intel computer UI 1102. The intel computer UI 1102 can provide a get subscribers request 1106 to the CMS 124. The CMS 124 can route the get subscribers request 1106 to the register circuitry 216, such as is indicated by the get subscribers request 1108. The register circuitry 216 can issue a get subscribers request 1110 to the database 222. The database 222 can provide a list of current subscribers (subscribers which the analyst 702 handles) with results 1112. The register circuitry 216 can provide a get unsubscribed request 1114 to the database 222. An unsubscribed (or unclaimed) user is one that is not currently assigned to an analyst. The database 222 can return a list of unsubscribed users with a response 1116.

The register circuitry 216 can provide the list of subscribers and/or unsubscribed users to the CMS 124 at operation 1118. The CMS 124 can route the list of subscribers and/or unsubscribed to the intel computer UI 1102 at operation 1120.

The analyst 702 can claim one or more of the unsubscribed users. The analyst 702, using the intelligence computer 106, can produce a claim unsubscribed request 1122. The intel computer UI 1102 can provide a claim unsubscribed request 1124 to the CMS 124. The CMS 124 can route the claim unsubscribed request 1124 to the register circuitry 216, such as is represented by the claim unsubscribed request 1126. The register circuitry 216 can provide a verify analyst request 1128 to a registration UI 1003 of the mobile device 210, such as can include one or more of a username, password, activation code, or the like. A user of the mobile device 210 can approve or deny the analyst verification using a verification request 1130 provided to the registration UI 1003. The registration UI 1003 can provide an analyst ok communication 1132 to the register circuitry 216. The register circuitry 216 can issue a request 1134 to update the database 222 to indicate that the user or the mobile device is now subscribed to the analyst 702 and/or is no longer unsubscribed.

The analyst 702 can release a user or device to which they are responsible for providing recommendations or notifications. Operations for releasing a subscriber can include the analyst 702 providing a release subscribed request 1136 to the intel computer UI 1102, such as by selecting a control provided on the intel computer UI 1102. The intel computer UI 1102 can provide a release subscribed request 1138 to the CMS 124. The CMS 124 can route the release subscribed request 1138 to the register circuitry 216, such as is represented by the release subscribed request 1140. The register circuitry 216 can provide an update subscriber request 1142 to the database 222. The update subscriber request 1142 can indicate a user ID or a device ID to which the analyst 702 is unsubscribing. The register circuitry 216 can provide the CMS 124 with a delete query request 1144. The CMS 124 can route the delete query request 1144 to the query manager circuitry 229, such as is represented by the delete query request 1146. The query manager circuitry 229 can provide a delete query request 1148 to the database 222, such as can cause the database 222 to change a status of the query to inactive, delete the query, or otherwise indicate that the query is not to be performed.

Figure 12:
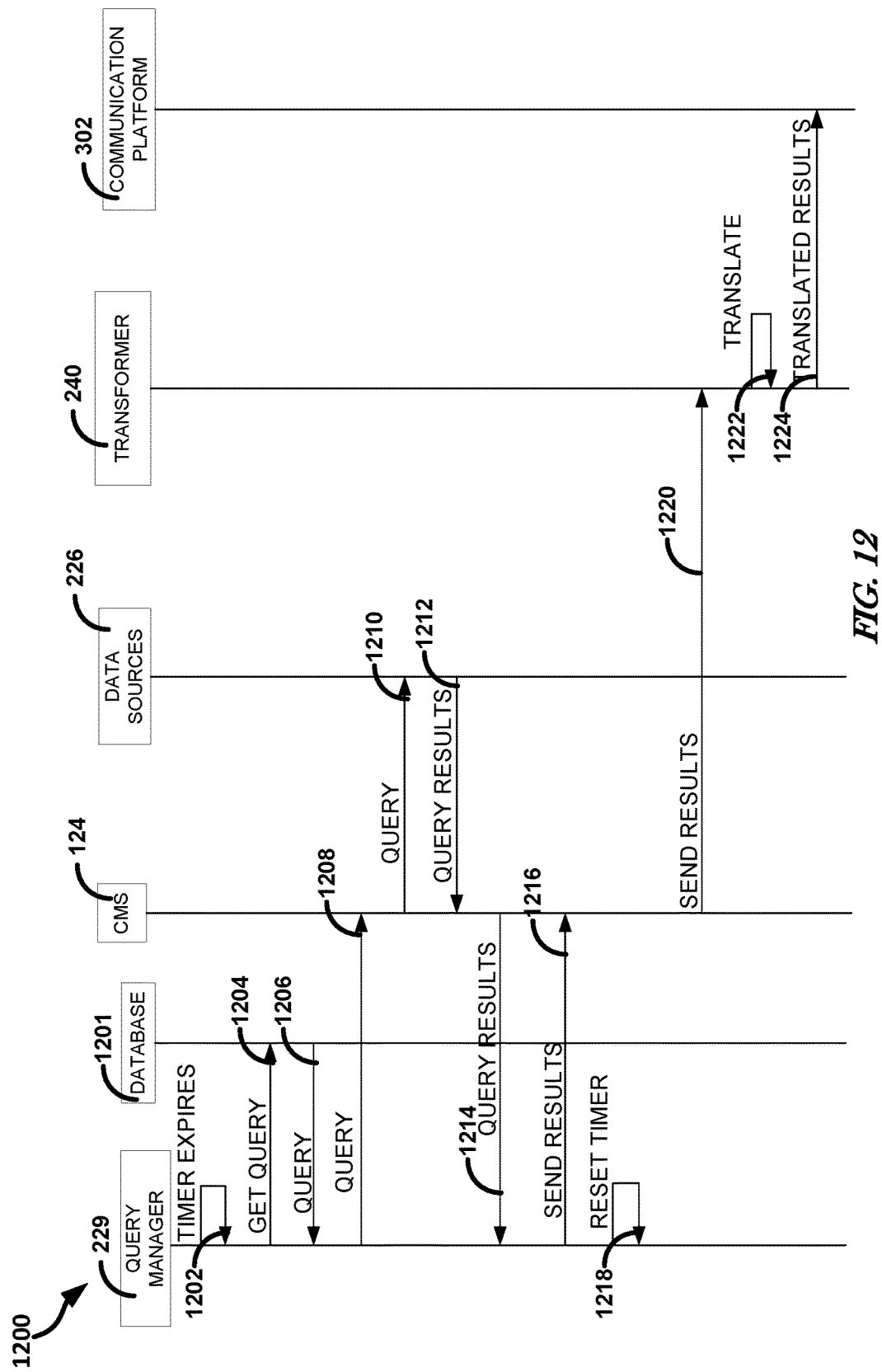
FIG. 12 illustrates, by way of example, a communication diagram of an embodiment of communications for delivering content to an end user device.

FIG. 12 illustrates, by way of example, a communication diagram of an embodiment of operations 1200 including communications for delivering content to an end user device, such as through the communication platform 302. In one or more embodiments, the query can be executed on the intel server 104 and results of the query can be provided to the mobile device 210 and/or the intelligence computer 106, such that the analyst 702 can view the results. The operations 1200 include communications between the query manager circuitry 229, the database 136, the CMS 124, data sources 226, the transform circuitry 240, and the communication platform 302.

At operation 1202 a timer of the query manager circuitry 229 can expire. The time expiring indicates that a specified amount of time has passed since a query was last executed. In response to the timer expiring, the query manager circuitry can provide a get query request 1204 to a query database 1201 of the query manager circuitry 229. The database 1201 can return a query, at operation 1206, associated with a user ID, device ID, analyst ID, and/or query ID at operation 1206. The returned query 1206 can be provided to the CMS 124, such as in communication 1208. The CMS 124 can route the query to the data sources 226, such as is represented by the communication 1210. The query can be executed on one or more of the data sources 226, and the data sources 226 can return the query results 1212 to the CMS 124. The CMS 124 can route the query results 1212 based to the query manager circuitry 229, such as is represented by communication 1214. The query results, from the communication 1214, can be filtered and/or formatted by the query manager circuitry 229 and provided to the CMS in a send results request 1216. The query manager circuitry 229 can reset the time at operation 1218. The CMS 124 can route the send results request 1216 to the transform circuitry 240, such as is represented by the send results request 1220. The transform circuitry 240 can translate the results into a form compatible with the communication platform at operation 1222. The transform circuitry 240 can provide the translated results to the communication platform at operation 1224.

Figure 13:
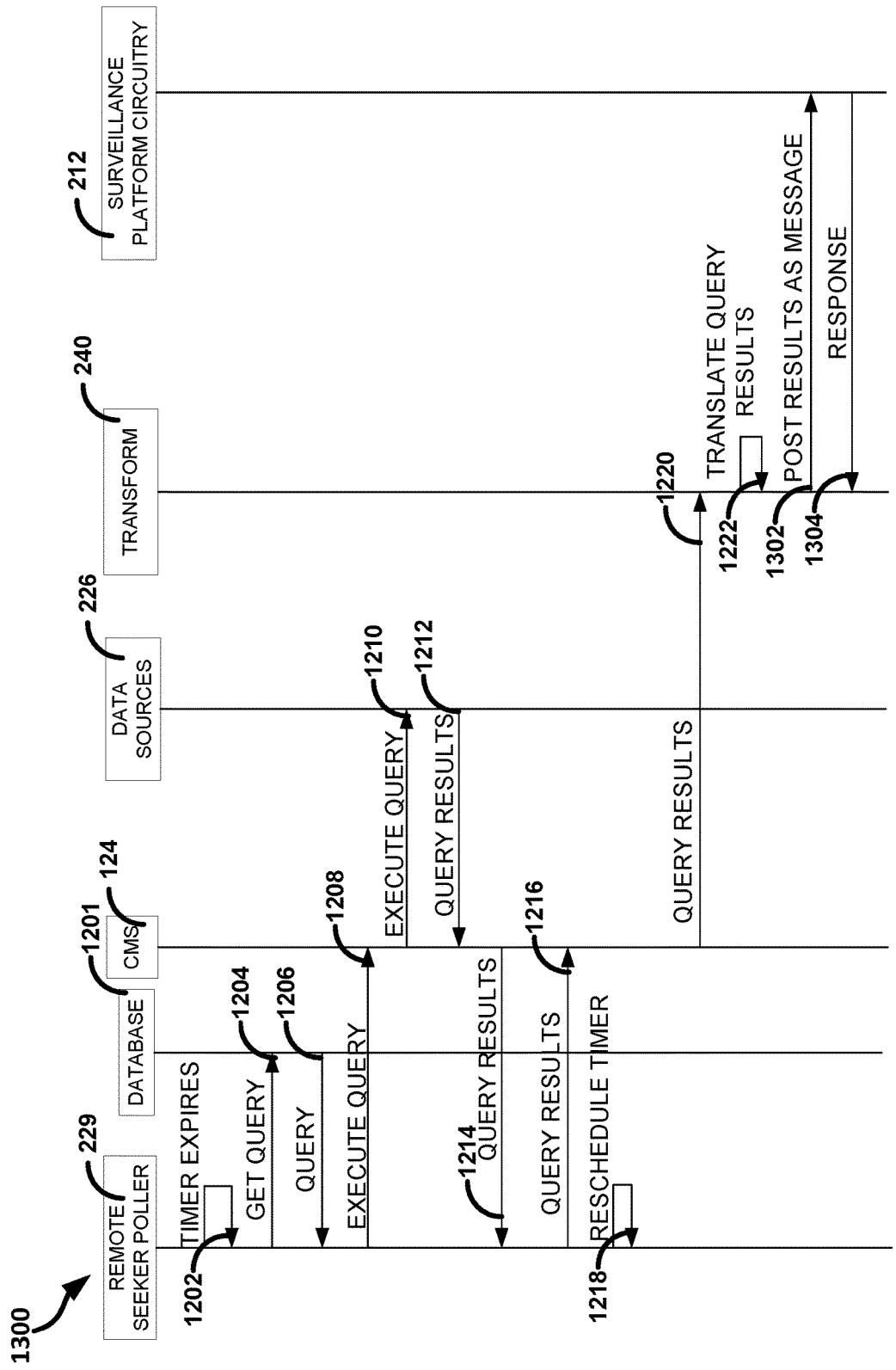
FIG. 13 illustrates, by way of example, a communication diagram of an embodiment of communications for creating, updating, and/or deleting a standing query.
Figure 14:
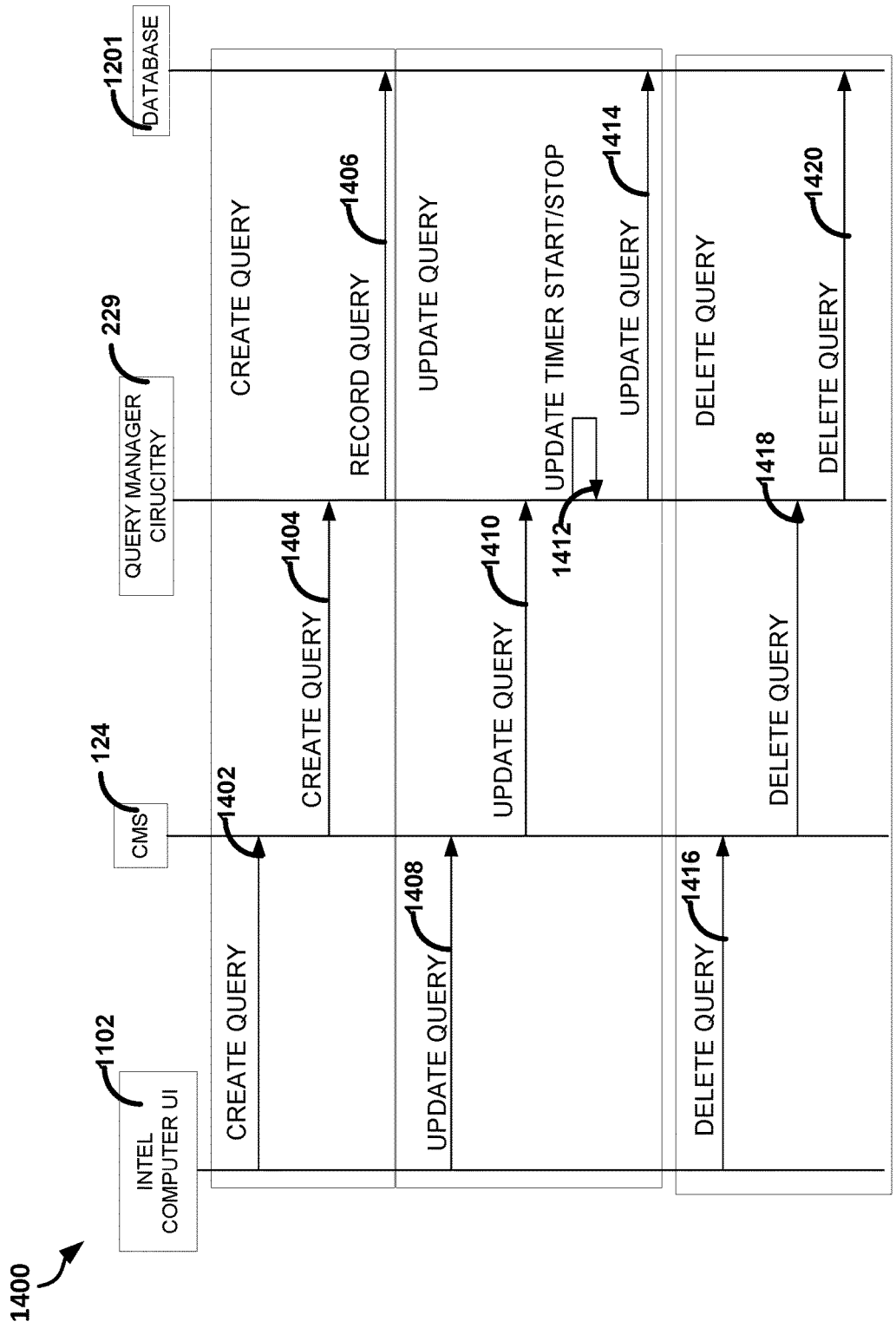
FIG. 14 illustrates, by way of example, a communication diagram of an embodiment of communications for providing results of a standing query to an end user device.

FIG. 13 illustrates, by way of example, a communication diagram of an embodiment of operations 1300 including communications for providing results of a standing query to an end user device, such as the mobile device 210. The operations 1300 are similar to the operations 1200 until after translation of the query results at operation 1222. A post results as message request 1302 can be provided from the transform circuitry 240 to the surveillance platform circuitry 212. A response 1304 indicating success or failure of posting the message can be provided from the surveillance platform circuitry 212 to the transform circuitry FIG. 14 illustrates, by way of example, a communication diagram of an embodiment of operations including communications for creating, updating, and/or deleting a query, such as a standing query. A standing query is one that is executed automatically according to a schedule, such as periodically. A user (e.g., of the mobile device 210 or the intelligence computer 106) can define a query and the schedule for executing the query. The query can be stored in the database 1201 of the query manager circuitry 229. The operations 1400 include communications between the intel computer UI 1102, the CMS 124, the query manager circuitry 229, and/or the database 1201. The operations 1400 include operations for creating a query, updating a query, and deleting a query.

Creating a query can include providing a create query request 1402 from the intel computer UI 1102 to the CMS 124. The CMS 124 can route the create query request 1402 to the query manager circuitry 229, such as is represented by the create query request 1404. The query manager circuitry 229 can provide a record query request 1406 to the database 1201. The record query request 1406 can indicate information to be obtained by the query, a schedule by which to execute the query, a user ID and/or analyst ID to which to provide results of the query, and/or a mobile device ID to which to return the results.

Updating a query can include providing, from the intel computer UI 1102, an update query request 1408 to the CMS 124. The update query request 1408 can indicate which query is being updated, such as by query ID, and how the query is being updated (e.g., by indicating a new schedule or data which is being sought). The CMS 124 can route the update query request 1408 to the query manager circuitry 229, such as is represented by the update query request 1410. The query manager circuitry 229 can update a timer start/stop time at operation 1412, such as if the update query request 1410 indicates that the query schedule is to be updated. The query manager circuitry 229 can provide an update query request 1414 to the database 1201, such as to alter an entry in the database 1201 associated with the query.

Deleting a query can include providing a delete query request 1416 from the intel computer UI 1102 to the CMS 124. The CMS 124 can route the delete query request 1416 to the query manager circuitry 229, such as is represented by the create query request 1418. The query manager circuitry 229 can provide a delete query request 1420 to the database 1201. The delete query request 1420 can indicate a query ID of the query to be deleted.

Using the systems 100, 200, and/or 300, such as can implement the operations 400, 500, 600, 700, 800, 900, 1000, 1100, 1200, 1300, and 1400 communications to a tactical edge can be expanded beyond voice-only and/or point-to-point messaging. Personalized notices can be provided based on a user's situation and intel received and/or ingested (real-time). The notices can be vetted by a human analyst prior to providing the message to an end user device. While specific products are discussed herein as being part of the systems 100, 200, and 300, other products may be used in place of the products described herein. Thus, the products listed are merely non-limiting examples of devices that can enable embodiments discussed herein.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product (e.g., a computer program tangibly embodied in an information carrier. e.g., in a machine-readable medium for execution by, or to control the operation of, data processing apparatus, e.g., a programmable processor, a computer, or multiple computers).

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, circuitry (e.g., a field programmable gate array (FPGA) or an application-specific integrated circuit (ASIC)). Circuitry can include one or more transistors, resistors, capacitors, inductors, diodes, regulators (voltage or current), radios, antennas, modulators, demodulators, analog to digital converters, digital to analog converters, oscillators, logic gates, or other electric or electronic components arranged as a state machine, circuit, or other processing unit to implement one or more of the operations of the operations 400, 500, 600, 700, 800, 900, 1000, 1100, 1200, 1300, and/or 1400.

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium (e.g., Storage Device)

Figure 15:
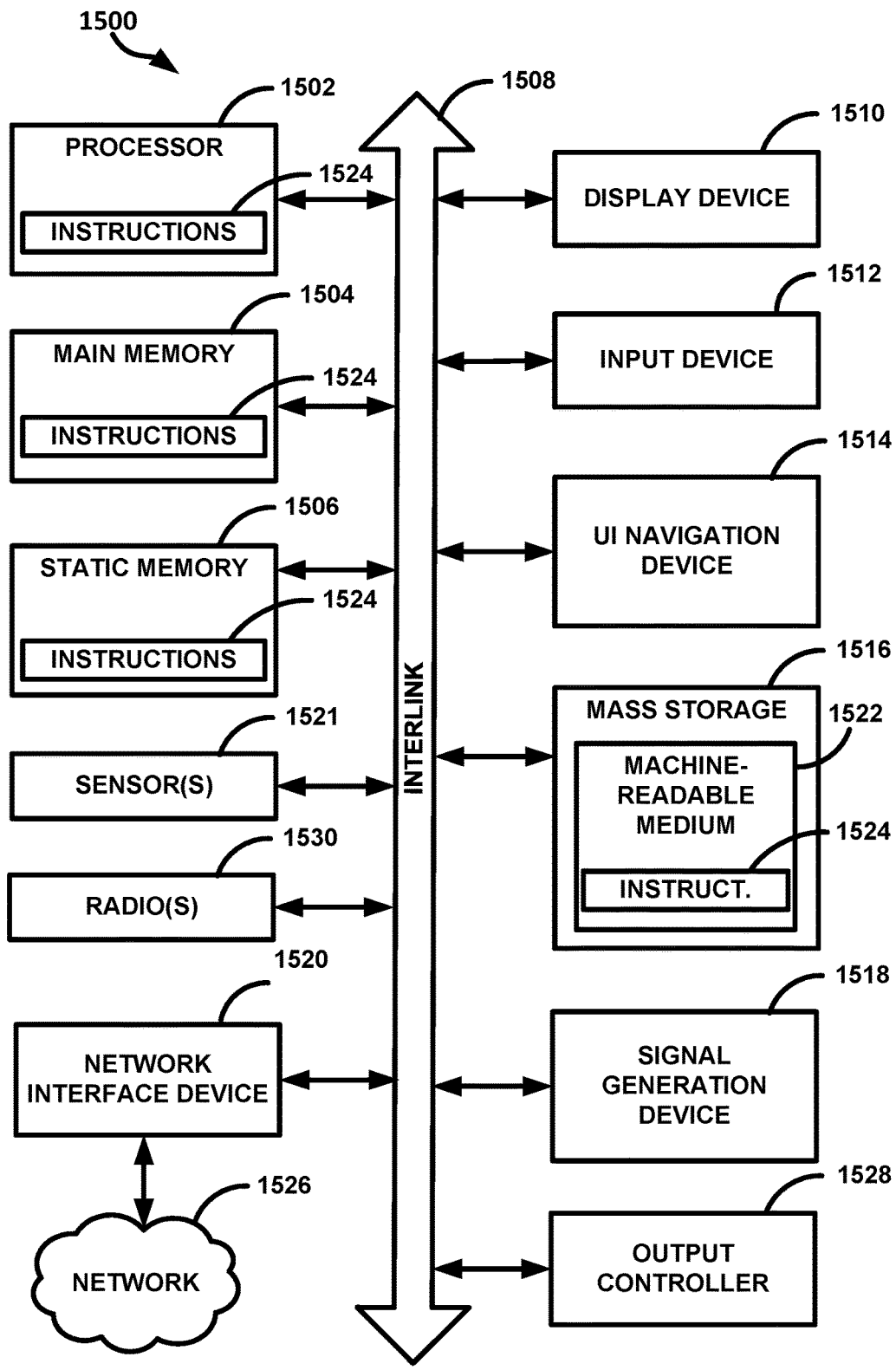
FIG. 15 illustrates, by way of example, a logical block diagram of an embodiment of a system including components that can carry out operations of communications or methods discussed herein.

FIG. 15 illustrates, by way of example, a block diagram of an embodiment of a machine in the example form of a computer system 1500 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1504 and a static memory 1506, which communicate with each other via a bus 1508. The computer system 1500 may further include a video display unit 1510 (e.g., a liquid crystal display (LCD) or a cathode ray tube (CRT)). The computer system 1500 also includes an alphanumeric input device 1512 (e.g., a keyboard), a user interface (UI) navigation device 1514 (e.g., a mouse), a disk drive unit 1516, a signal generation device 1518 (e.g., a speaker), a network interface device 1520, and radios 1530 such as Bluetooth. WWAN, WLAN, and NFC, permitting the application of security controls on such protocols.

Machine-Readable Medium

The disk drive unit 1516 includes a machine-readable medium 1522 on which is stored one or more sets of instructions and data structures (e.g., software) 1524 embodying or utilized by any one or more of the methodologies or functions described herein. The instructions 1524 may also reside, completely or at least partially, within the main memory 1504 and/or within the processor 1502 during execution thereof by the computer system 1500, the main memory 1504 and the processor 1502 also constituting machine-readable media.

While the machine-readable medium 1522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices: magnetic disks such as internal hard disks and removable disks; magneto-optical disks; and CD-ROM and DVD-ROM disks.

Transmission Medium

The instructions 1524 may further be transmitted or received over a communications network 1526 using a transmission medium. The instructions 1524 may be transmitted using the network interface device 1520 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Additional Notes and Examples

In Example 1 a system can include an intelligence server including a common message server (CMS), query manager circuitry, an intelligence database, and alerting service circuitry, the CMS communicatively coupled between each of the query manager circuitry and the intelligence database, and the alerting service circuitry and the query manager circuitry, an intelligence computer communicatively coupled to the CMS of the intelligence server, the intelligence computer including a recommendation user interface (UI) and a notifier UI, and a mobile device communicatively coupled to the CMS, the mobile device configured to receive notifications and recommendations from the intelligence computer that are routed to the mobile device through the CMS.

In Example 2, Example 1 can further include, wherein the intelligence computer is configured to provide an analyst with a view of the recommendations and notifications and the notifier UI is configured to provide a control that, when selected by the analyst, causes the notifier UI to provide an associated notification of the notifications to the CMS.

In Example 3, at least one of Examples 1-2 can further include, wherein the notifier UI is further configured to provide the analyst with a view of another control that allows the analyst to indicate end users to which the notification is to be provided.

In Example 4, at least one of Examples 1-3 can further include, wherein the alerting service circuitry is configured to determine whether conditions, based on a policy that defines the conditions, are met, and in response to a determination that the conditions are met, provide a notification of the notifications to the notification UI.

In Example 5, at least one of Examples 1-4 can further include, wherein the query manager circuitry is configured to provide a standing query to the CMS in response to a timer associated with the standing query expiring, and wherein the alerting service circuitry is configured to receive results of the query from the intelligence database and determine whether conditions defined in a policy are met.

In Example 6, at least one of Examples 1-5 can further include, wherein the intelligence computer includes another UI that allows the analyst to subscribe to providing recommendations and notifications to an end user and to release an end user to which the analyst is subscribed.

In Example 7, at least one of Examples 1-6 can further include an intermediate server communicatively coupled between the mobile device and the CMS, the intermediate server including transform circuitry configured to translate data received from the mobile device into a form compatible with the intelligence server and provide the translated data to the CMS.

In Example 8, Example 7 can further include, wherein the CMS includes circuitry configured to monitor available bandwidth and packet loss between the mobile device and the CMS and to adjust a payload of a communication to the mobile device based on the available bandwidth.

In Example 9, Example 8 can further include, wherein the circuitry of the CMS changes the payload of the communication from a transmission control protocol communication to a user datagram protocol communication in response to determining the packet loss is greater than, or equal to, a threshold packet loss.

In Example 10, at least one of Examples 7-9 can further include, wherein the intermediate server includes register circuitry and a register database communicatively coupled to the register circuitry, the registry circuitry to manage an analyst subscribing to provide the notifications and recommendations to the mobile device and the mobile device registration with the system.

Example 11 can include a method including receiving, at a common message server (CMS) and from query manager circuitry, a standing query to be executed periodically, routing, by the CMS, the standing query to an intelligence database, executing the query on the intelligence database, providing, by the intelligence database, results of executing the standing query to alerting service circuitry, comparing, by the alerting service circuitry, the results to one or more policies and determining whether conditions of one or more of the one or more policies are satisfied, in response to determining the conditions of one or more of the policies are satisfied, providing a notification to the CMS, routing, by the CMS, the notification to an intelligence computer, the notification indicating the policy that is satisfied, and displaying, by a notification user interface (UI) of the intelligence computer, a view of the intelligence computer.

In Example 12, Example 11 can further include receiving, by the notification UI, approval for the notification, in response to receive the approval, providing, by the UI, the notification to the CMS, and routing, by the CMS, the notification to a mobile device.

In Example 13, at least one of Examples 11-12 can further include providing, by a personal analytics engine, a recommendation to the CMS, routing, by the CMS, the recommendation to the intelligence computer, displaying, by a recommendation UI of the intelligence computer, a view of the recommendation, receiving, by the recommendation UI, approval for the recommendation, in response to receive the approval, providing, by the UI, the recommendation to the CMS, and routing, by the CMS, the recommendation to the mobile device.

In Example 14, at least one of Examples 11-13 can further include translating, by transform circuitry of an intermediate server communicatively coupled between the CMS and the mobile device, data received from the mobile device into a form compatible with the intelligence server; and providing the translated data to the CMS.

In Example 15, Example 14 can further include monitoring, by circuitry of the CMS, available bandwidth and packet loss between the mobile device and the CMS; and adjusting a payload of a communication to the mobile device based on the available bandwidth and packet loss.

In Example 16, Example 15 can further include changing the payload of the communication from a transmission control protocol communication to a user datagram protocol communication in response to determining the packet loss is greater than, or equal to, a threshold packet loss.

Example 17 can include a system including an intelligence server including a common message server (CMS), query manager circuitry, an intelligence database, and alerting service circuitry, the CMS communicatively coupled between each of the query manager circuitry and the intelligence database, and the alerting service circuitry and the query manager circuitry, an intelligence computer communicatively coupled to the CMS of the intelligence server, the intelligence computer including a recommendation user interface (UI) and a notifier UI, an intermediate server including transform circuitry and register circuitry, and a mobile device communicatively coupled to the intermediate server, the mobile device configured to receive notifications and recommendations from the intelligence computer that are routed to the intermediate server through the CMS.

In Example 18, Example 17 can further include a personal analytics engine communicatively coupled to the CMS to analyze data from the mobile device and provide a recommendation to the intelligence computer through the CMS.

In Example 19, Example 18 can further include, wherein the CMS includes circuitry configured to monitor available bandwidth and packet loss between the mobile device and the CMS and to adjust a payload of a communication to the mobile device based on the available bandwidth.

In Example 20, Example 19 can further include, wherein the circuitry of the CMS changes the payload of the communication from a transmission control protocol communication to a user datagram protocol communication in response to determining the packet loss is greater than, or equal to, a threshold packet loss.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A system comprising:
   an intelligence server including:
      a common message server (CMS) to monitor network conditions of communication channels between an intelligence computer and a mobile device, to adjust a payload of a communication from the intelligence computer to the mobile device based on the available bandwidth, and monitor whether the communication is a recommendation or notification, the network conditions including packet loss, packet latency, and bandwidth of the communication channel, the CMS to receive recommendations and notifications from a personal analytics engine, the recommendations including a guess by the personal analytics engine that data of the recommendation is beneficial to a user of the mobile device, and the notifications including data that satisfies one or more conditions defined in a policy,
      query manager circuitry to execute and manage standing queries,
      an intelligence database on which to execute the queries, and
      alerting service circuitry to determine whether the policy is met based on data in the intelligence database and provide a notification of the notifications to the intelligence computer,
      the CMS communicatively coupled between each of (1) the query manager circuitry and the intelligence database, and (2) the alerting service circuitry and the query manager circuitry;
      the intelligence computer communicatively coupled to the CMS of the intelligence server,
   the intelligence computer including:
      a recommendation user interface (UI) through which the recommendation is vetted by a user of the intelligence computer, and
      a notifier UI through which the notification is vetted by the user of the intelligence computer; and
   the mobile device communicatively coupled to the CMS, the mobile device configured to receive the notification and the recommendation from the intelligence computer that are routed to the mobile device through the CMS.

2. The system of claim 1, wherein the intelligence computer is configured to provide an analyst with a view of the recommendations and notifications and the notifier UI is configured to provide a control that, when selected by the analyst, causes the notifier UI to provide an associated notification of the notifications to the CMS.

3. The system of claim 1, wherein the notifier UI is further configured to provide the analyst with a view of another control that allows the analyst to indicate mobile devices to which the notification is to be provided.

4. The system of claim 1, wherein the query manager circuitry is configured to provide a standing query to the CMS in response to a timer associated with the standing query expiring, and wherein the alerting service circuitry is configured to receive results of the query from the intelligence database and determine whether the conditions defined in the policy are met.

5. The system of claim 1, wherein the intelligence computer includes another UI that allows the analyst to subscribe to providing recommendations and notifications to an end user and to release an end user to which the analyst is subscribed.

6. The system of claim 1, further comprising an intermediate server communicatively coupled between the mobile device and the CMS, the intermediate server including transform circuitry configured to translate data received from the mobile device into a form compatible with the intelligence server and provide the translated data to the CMS.

7. The system of claim 6, wherein the intermediate server includes register circuitry and a register database communicatively coupled to the register circuitry, the registry circuitry to manage an analyst subscribing to provide the notifications and recommendations to the mobile device and the mobile device registration with the system.

8. The system of claim 1, wherein the circuitry of the CMS changes the payload of the communication from a transmission control protocol (TCP) communication to a user datagram protocol (UDP) communication in response to determining the packet loss is greater than, or equal to, a threshold packet loss.

9. A method for generating vetted recommendations and notifications for mobile devices, the method comprising:
monitoring, at a common message server (CMS) of an intelligence server, network conditions of communication channels between an intelligence computer and the mobile devices;
receiving, at the CMS and from query manager circuitry of the intelligence server, a standing query to be executed periodically;
routing, by the CMS, the standing query to an intelligence database of the intelligence server;
executing the query on the intelligence database;
providing, by the intelligence database, results of executing the standing query to alerting service circuitry;
comparing, by the alerting service circuitry, the results to one or more policies and determining whether conditions of one or more of the one or more policies are satisfied;
in response to determining the conditions of one or more of the policies are satisfied, providing a notification to the CMS;
routing, by the CMS, the notification to an intelligence computer, the notification indicating the policy that is satisfied;
displaying, by a notification user interface (UI) of the intelligence computer, a view of the notification;
receiving, by the notification UI, an indication of which mobile device of the mobile devices to send the notification;
adjusting, by the CMS, a format of the notification based on the monitored network conditions; and
providing, the CMS, the notification, in the adjusted format, to the mobile device.

10. The method of claim 9, further comprising:
receiving, by the notification UI, approval for the notification; and
in response to receiving the approval, providing, by the UI, the notification to the CMS.

11. The method of claim 9, further comprising:
providing, by a personal analytics engine, a recommendation to the CMS, the recommendation including data that the personal analytics engine determines is beneficial to a user of the mobile device;
routing, by the CMS, the recommendation to the intelligence computer;
displaying, by a recommendation UI of the intelligence computer, a view of the recommendation;
receiving, by the recommendation UI, approval for the recommendation;
in response to receive the approval, providing, by the UI, the recommendation to the CMS;
adjusting by the CMS and based on the monitored network conditions, a format of the recommendation; and
routing, by the CMS, the recommendation, in the adjusted format, to the mobile device.

12. The method of claim 9, further comprising translating, by transform circuitry of an intermediate server communicatively coupled between the CMS and the mobile device, data received from the mobile device into a form compatible with the intelligence server; and
providing the translated data to the CMS.

13. The method of claim 12, wherein the network conditions include available bandwidth, packet loss, and packet latency between the mobile device and the CMS; and
adjusting a payload of a communication to the mobile device based on the available bandwidth and packet loss.

14. The method of claim 13, further comprising changing the payload of the communication from a transmission control protocol communication to a user datagram protocol communication in response to determining the packet loss is greater than, or equal to, a threshold packet loss.

15. A system comprising:
an intelligence server including:
a common message server (CMS) to monitor network conditions of communication channels between an intelligence computer and a mobile device, to adjust a payload of a communication from the intelligence computer to the mobile device based on the available bandwidth, and monitor whether the communication is a recommendation or notification, the network conditions including packet loss, packet latency, and bandwidth of the communication channel, the CMS to receive recommendations and notifications from a personal analytics engine, the recommendations including a guess by the personal analytics engine that data of the recommendation is beneficial to a user of the mobile device, and the notifications including data that satisfies one or more conditions defined in a policy,
query manager circuitry to execute and manage standing queries,
an intelligence database on which to execute the queries, and
alerting service circuitry to determine whether the policy is met based on data in the intelligence database and provide a notification of the notifications to the intelligence computer, the CMS communicatively coupled between each of (1) the query manager circuitry and the intelligence database, and (2) the alerting service circuitry and the query manager circuitry; the intelligence computer communicatively coupled to the CMS of the intelligence server, the the intelligence computer including:
a recommendation user interface (UI) through the user of the intelligence computer vets the recommendation, and
a notifier UI through which the user of the intelligence computer to vet the notifier;
an intermediate server coupled between the mobile device and the intelligence server, the intermediate server including:
transform circuitry to translate data received from the mobile device into a form compatible with the intelligence server and provide the translated data to the CMS, and
register circuitry to manage a user of the intelligence computer subscribing to provide the notifications and recommendations to the mobile device and the mobile device registration with the system, and
the mobile device communicatively coupled to the intermediate server, the mobile device configured to receive the notification and the recommendation from the intelligence computer that are routed to the intermediate server through the CMS.

16. The system of claim 15, further comprising a personal analytics engine communicatively coupled between the CMS and the mobile device to analyze data from the mobile device and provide a recommendation to the intelligence computer through the CMS.

17. The system of claim 15, wherein the circuitry of the CMS changes the payload of the communication from a transmission control protocol communication to a user datagram protocol communication in response to determining the packet loss is greater than, or equal to, a threshold packet loss.

* * * * *